United States Patent
Yun et al.

(10) Patent No.: US 10,116,482 B2
(45) Date of Patent: Oct. 30, 2018

(54) SYMBOL TRANSMISSION METHOD AND APPARATUS FOR USE IN FILTER BANK MULTICARRIER SYSTEM

(71) Applicant: Samsung Electronics Co., Ltd., Suwon-si, Gyeonggi-do (KR)

(72) Inventors: Yeohun Yun, Hwaseong-si (KR); Chanhong Kim, Hwaseong-si (KR); Kyeongyeon Kim, Hwaseong-si (KR); Jiyun Seol, Seongnam-si (KR); Taeyoung Kim, Seoul (KR); Byunghwan Lee, Yongin-si (KR); Ka Ming Ho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 14/851,669

(22) Filed: Sep. 11, 2015

(65) Prior Publication Data

US 2016/0080187 A1     Mar. 17, 2016

(30) Foreign Application Priority Data

Sep. 12, 2014 (KR) .................. 10-2014-0121295

(51) Int. Cl.
  *H04L 27/26*  (2006.01)
  *H04L 27/38*  (2006.01)
  *H04L 27/34*  (2006.01)

(52) U.S. Cl.
  CPC ........ *H04L 27/264* (2013.01); *H04L 27/2602* (2013.01); *H04L 27/38* (2013.01); *H04L 27/3411* (2013.01)

(58) Field of Classification Search
  CPC .............. H04L 27/264; H04L 27/2602; H04L 27/2634; H04L 27/362; H04L 5/0007;
  (Continued)

(56) References Cited

U.S. PATENT DOCUMENTS

2011/0142152 A1  6/2011  Bellanger
2012/0189036 A1*  7/2012  Bellanger ........... H04L 27/2652
                                                          375/146

(Continued)

FOREIGN PATENT DOCUMENTS

JP     2013-507024 A     2/2013

*Primary Examiner* — Michelle M Koeth
(74) *Attorney, Agent, or Firm* — Jefferson IP, Law, LLP

(57) ABSTRACT

A method and apparatus for transmitting symbols for use in an FBMC wireless communication system are provided. The FBMC symbol transmission method includes determining a truncation point of a first FBMC symbol overlapping a transient transmission duration based on an energy distribution characteristic of a first filter applied to the first FBMC symbol, wherein the first FMBC symbol is to be transmitted in a non-transient transmission duration, truncating the first FBMC symbol at the truncation point in the transient transmission duration, changing an energy characteristic of a second filter, filtering the first FBMC symbol using the second filter, filtering FBMC symbols positioned within the non-transient transmission duration based on a non-transient transmission duration characteristic; and transmitting the filtered FBMC symbols at a corresponding transmission timing.

22 Claims, 39 Drawing Sheets

(58) Field of Classification Search
CPC . H04L 25/08; H04L 27/2652; H04L 27/3411; H04L 27/38
See application file for complete search history.

(56) References Cited

U.S. PATENT DOCUMENTS

| | | |
|---|---|---|
| 2012/0243625 A1 | 9/2012 | Berg |
| 2014/0192925 A1 | 7/2014 | Li |
| 2014/0233437 A1 | 8/2014 | Abdoli et al. |
| 2015/0372843 A1* | 12/2015 | Bala .................. H04L 25/03834 375/295 |

* cited by examiner

SYMBOL TRANSMISSION METHOD AND APPARATUS FOR USE IN FILTER BANK MULTICARRIER SYSTEM

CROSS-REFERENCE TO RELATED APPLICATION(S)

This application claims the benefit under 35 U.S.C. § 119(a) of a Korean patent application filed on Sep. 12, 2014 in the Korean Intellectual Property Office and assigned Serial number 10-2014-0121295, the entire disclosure of which is hereby incorporated by reference.

TECHNICAL FIELD

The present disclosure relates to a method and apparatus for transmitting symbols in a filter bank multi-carrier (FBMC) wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the increasing demand for mobile data services, code division multiple access (CDMA) as one of the representative $3^{rd}$ Generation (3G) technologies has been replaced by orthogonal frequency division multiple access (OFDMA) in order to meet the data rate requirements of the 4th Generation (4G) communication standard. In the OFDMA system, data is transmitted using a plurality of orthogonal frequency components so as to increase the data rate in comparison to the CDMA system as a 3G wireless communication system. The OFDMA is adopted in various wireless communication systems such as wireless broadband (Wibro) as well as long term evolution (LTE) and LTE-advanced (LTE-A).

However, exponentially growing mobile data traffic is spurring the development of a next generation wireless communication system capable of accommodating more traffic. There is therefore a need of a technology capable of transmitting more data than the current OFDMA.

Filter bank multi-carrier (FBMC) is a potential candidate capable of replacing OFDMA to accommodate the increasing data traffic.

In comparison to the OFDMA system, the FBMC system does not require redundant cyclic prefix (CP) so as to obtain a large gain in the symbol transmission rate in the time domain. Furthermore, using a filter with good spectral confinement characteristic makes it possible to reduce the number of guard carriers in the guard band.

In view of the transmission signal, the FBMC system is characterized in that the filter occupies a long period on the time axis and the symbols are overlapped to increase the symbol transmission rate. As a result, this technique makes it possible to secure a symbol transmission rate almost equal to the case of transmitting orthogonal frequency division multiplexing (OFDM) symbols without CP in the legacy CP-OFDM system, especially when continuously transmitting long strings of data.

Even in the FBMC-based wireless communication scheme, however, if the transmission and reception alternate in time on the same frequency band, it is difficult to expect a positive effect obtained through overlapping transmission data as if transmitting OFDM symbols without CP at the transmission start and end time points.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a symbol transmission method and apparatus capable of improving symbol transmission efficiency in a filter-bank multi-carrier (FBMC)-based wireless communication system.

Another aspect of the present disclosure is to provide a symbol transmission method and apparatus capable of minimizing reception performance degradation in a FBMC-based wireless communication system.

Another aspect of the present disclosure is to provide a symbol reception method and apparatus capable of receiving the symbols efficiently in a FBMC-based wireless communication system.

In accordance with an aspect of the present disclosure, a method of transmitting FBMC symbols in a FBMC system is provided. The method includes determining a truncation point of an FBMC symbol overlapped with a transient transmission duration (period) according to an energy distribution characteristic of a filter applied to the FBMC symbol to be transmitted in a non-transient transmission duration, truncating the FBMC symbol at the truncation point in the transient transmission duration, changing an energy characteristic of a filter according to the energy distribution characteristic of the filter to be applied to the truncated FBMC symbol, filtering the FBMC symbol overlapped with the transient transmission duration using the filter having the changed energy characteristic, filtering the FBMC symbols positioned within the non-transient transmission duration according to a non-transient transmission duration characteristic, and transmitting the filtered FBMC symbols at a corresponding transmission timing.

In accordance with another aspect of the present disclosure, an apparatus for transmitting FBMC symbols in a FBMC system is provided. The apparatus includes a switch configured to switch each FBMC symbol to one of a pre-transient transmission duration filter, a non-transient transmission duration filter, and a post-transient transmission duration filter, the pre-transient transmission duration filter configured to truncate the FBMC symbol of which part overlapped with the pre-transient transmission duration and change the energy distribution characteristic of the FBMC symbol, the post-transient transmission duration filter configured to truncate the FBMC symbol of which part overlapped with the post-transient transmission duration and change the energy distribution characteristic of the FBMC symbol, the non-transient transmission duration filter configured to filter the whole FBMC symbol positioned within the non-transient transmission duration, a parallel/series conversion unit configured to perform parallel/series conversion on the FBMC symbols output from the pre-transient transmission duration filter, the post-transient transmission duration filter, and the non-transient transmission duration filter, and a control unit configured to control the operations of the switch and the filters.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with accompanying drawings, in which.

Throughout the drawings, it should be noted that like reference numbers are used to depict the same or similar elements, features, and structures.

DETAILED DESCRIPTION

Figure 1A:
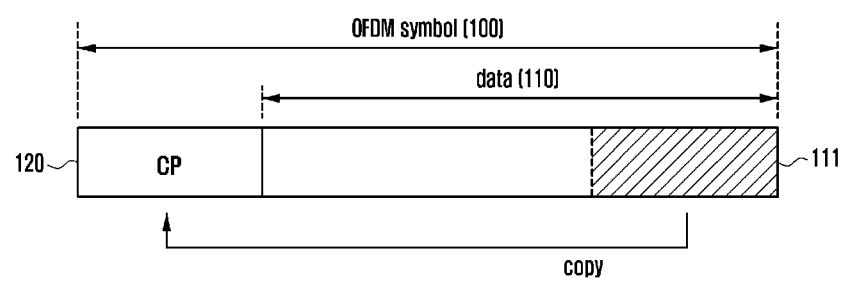
FIG. 1A is a diagram illustrating a structure of a symbol transmitted in an orthogonal frequency division multiplexing (OFDM)-based wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to explaining the present disclosure, a description is made of the difference between orthogonal frequency division multiplexing (OFDM) and filter bank multi-carrier (FBMC) schemes.

OFDM typically has several advantages. First, it is possible to generate and separate signals simply using inverse fast Fourier transform (IFFT) and fast Fourier transform (FFT). Second, it is possible to obtain subcarrier gain through simplified equalization and to apply multi-antenna (multiple-input multiple-output (MIMO)) system channels simply. Third, it is possible to improve frequency utilization efficiency of the frequency band by arranging the subcarriers closely using the orthogonality of subcarriers. Fourth, it is possible to improve frequency efficiency and data rate by applying adaptive modulation schemes to the subcarrier bands.

OFDM also has several disadvantages. First, the OFDM has a structure inappropriate for multiple-access of multiple users in uplink (orthogonal frequency division multiple access ((OFDMA)). Also, although the OFDM requires perfect synchronization of the receiver to avoid inter-carrier-interference (ICI), it is difficult to acquire synchronization because the signals which the multiple users transmit at different positions arrive separately at different timings. Second, although it is possible to acquire synchronization simply using the cyclic prefix (CP), the CP occupies a part of ⅛ of the original signal space, resulting in reduction of the frequency utilization efficiency. The first, in the case where multiple users in different communication technology modes transmit signals simultaneously in the cognitive radio (CR) environment, the implementation complexity increases because various types of standard-specific filters are used. Also, the inter-band power leakage increases the inter-user interference so as to compromise the purpose of CR.

A description is made of the difference between OFDM and FBMC symbols with reference to accompanying drawings.

Figure 1B:
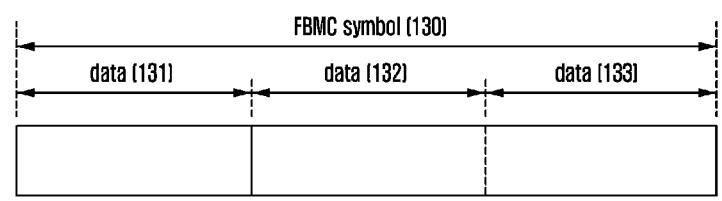
FIG. 1B is a diagram illustrating a structure of a symbol transmitted in a filter-bank multi-carrier (FBMC)-based wireless communication system according to an embodiment of the present disclosure.

FIG. 1A is a diagram illustrating a structure of a symbol transmitted in an OFDM-based wireless communication system according to an embodiment of the present disclosure. FIG. 1B is a diagram illustrating a structure of a symbol transmitted in a FBMC-based wireless communication system according to an embodiment of the present disclosure.

Referring to FIG. 1A, an OFDM symbol 100 consists of Cyclic Prefix (CP) 120 and a data symbol 110. The CP 120 is copied from the end of the symbol data as denoted by reference number 111. The CP 120 has a length long enough to remove inter-symbol interference (ISI) caused by multipath. Accordingly, the length of the CP 120 may be determined in consideration of the cell size and multipath time delay.

FIG. 1B shows the FBMC symbols with the overlapping factor (L) of 3.

Referring to FIG. 1B, an FBMC symbol 130 consists of three data symbols 131, 132, and 133 in such a way of repeating the OFDM symbol 100.

However, the FBMC symbol 130 is reconfigured into a format different from the OFDM symbol by applying a filter to the data symbols 131, 132, and 133 to generate the FBMC symbol. Accordingly, the data symbol 110 of the OFDM symbol and each of the data symbols 131, 132, and 133 constituting the FBMC symbol have a different format.

As described above, the FBMC symbol-based communication is inferior to the OFDM symbol-based communication in data rate. This is because the length of the CP is equal to or less than the data symbol in the OFDM symbol. Assuming that the length of the data symbol is k in the OFDM symbol 100, the length of the OFDM symbol is equal to or less than 2 k.

However, since the overlapping factor L of the FBMC symbol 130 which indicates the number of repetitions of data is set to a value equal to or greater than 2, the total length of the FBMC symbol becomes L×k. Accordingly, if only one symbol is transmitted, the FBMC transmission is inferior to the OFDM transmission in data transmission efficiency.

This problem is overcome by overlapping a plurality of transmission symbols in the FBMC scheme.

Figure 2A:
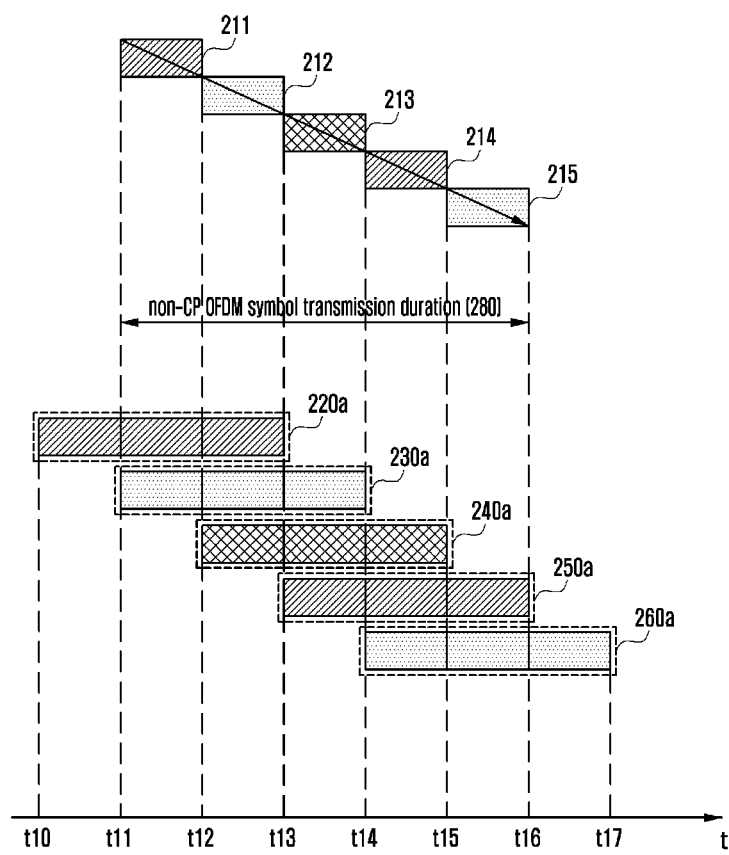
FIGS. 2A and 2B are diagrams explaining symbol transmissions in OFDM and FBMC schemes according to an embodiment of the present disclosure.
Figure 2B:
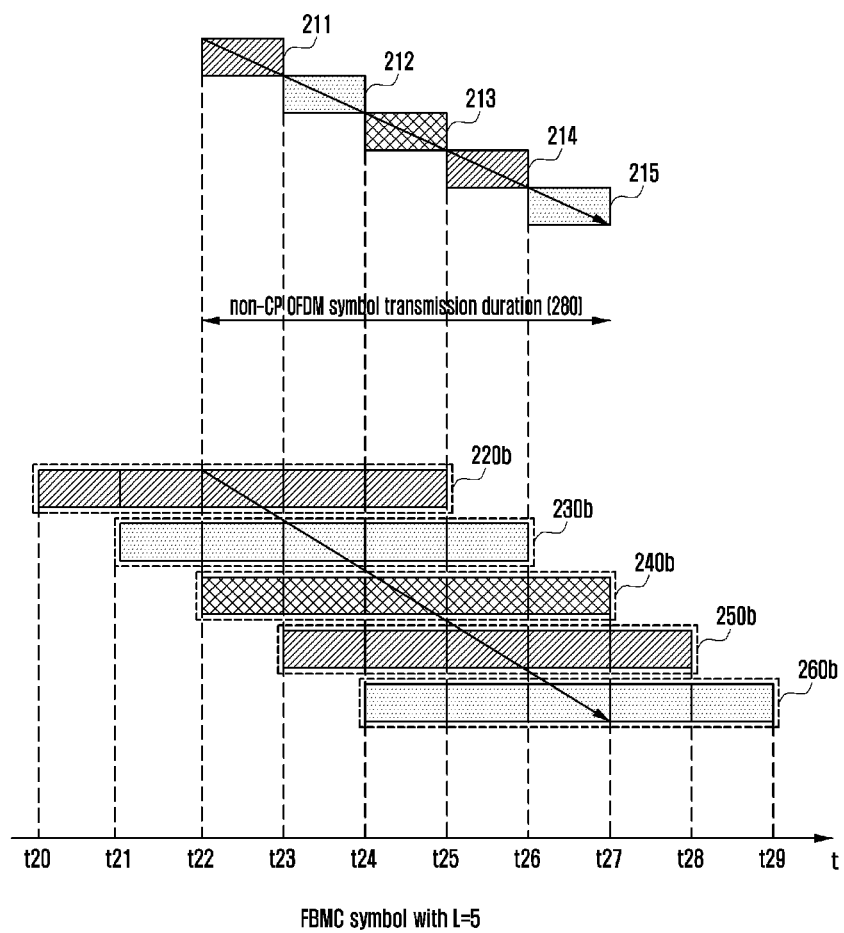

FIGS. 2A and 2B are diagrams for explaining symbol transmissions in OFDM and FBMC schemes according to an embodiment of the present disclosure.

Referring to FIG. 2A, the transmission timings of the non-CP OFDM symbols 211, 212, 213, 214, and 215 and the FBMC symbols 220a, 230a, 240a, 250a, and 260a with the overlapping factor L=3 comparatively, are shown.

The non-CP OFDM symbols 211, 212, 213, 214, and 215 are transmitted in the respective non-CP OFDM symbol transmission durations. For example, the transmission of the first non-CP OFDM symbol 211 starts at time t11 and ends at time t12, and the transmission of the second non-CP OFDM symbol 212 starts at time t12 and ends at time t13. The transmission of the fifth non-CP OFDM symbol 215 starts at time t15 and ends at time t16. Accordingly, the non-CP OFDM symbol transmission period 280 is equal to the sum of the transmission time durations of the five symbols, i.e. from t11 to t16. The symbol transmission duration (period) means the non-CP OFDM symbol transmission duration.

Each of the FBMC symbols 220a, 230a, 240a, 250a, and 260a with the overlapping factor L=3 is formatted in the form of 3 concatenated non-CP OFDM symbols transmitted in the 3 non-CP symbol transmission duration. For example, the transmission of the first FBMC symbol 220a starts at time t10 and ends at time t13, and the transmission of the second FBMC symbol 230a starts at time t11 and ends at time t14. The transmission of the fifth FBMC symbol 260a starts at time t14 and ends at time t17.

In this way, the FBMC symbols 220a, 230a, 240a, 250a, and 260a with the overlapping factor L=3 are overlapped in time. During the period between t11 and t16, two or more overlapped FBMC symbols are transmitted. During the period between t12 and t15, three overlapped symbols are transmitted.

If the FBMC symbols with the overlapping factor L=3 are transmitted as described above, the transmission period is longer than the non-CP OFDM symbol transmission period 280 by as much as 2 non-CP OFDM symbols. As shown in FIG. 2A, the FBMC symbol transmission period is longer than the non-CP OFDM symbol transmission period 280 by as much as the sum of the time duration between t10 and t11 and the time duration between t16 and t17. In the case of transmitting 5 FBMC symbols 220a, 230a, 240a, 250a, and 260a with the overlapping factor L=3, the symbol transmission period between t10 to 17 is equal to the length of 7 non-CP OFDM symbols. This means that the period of transmitting 5 FBMC symbols is longer than the period of transmitting 5 non-CP OFDM symbols by as much as 2 non-CP OFDM symbols. In general, the FBMC symbol transmission period is longer than the non-CP OFDM symbol transmission period by as much as Equation 1 at the beginning and end of the duration depending on the overlapping factor (L):

$$\frac{(L-1)}{2}M \qquad \text{Equation 1}$$

In Equation 1, M denotes the length of one non-CP OFDM symbol. As shown in Equation 1, as the overlapping factor L increases, the resource loss increases at the beginning and end of the FBMC symbol transmission period in comparison to the non-CP OFDM symbol transmission period. The description thereof is made on the assumption of the overlapping factor L=5 with reference to FIG. 2B.

Referring to FIG. 2B, the transmission timings of the non-CP OFDM symbols 211, 212, 213, 214, and 215 and the FBMC symbols 220b, 230b, 240b, 250b, and 260b with the overlapping factor L=5 are shown by way of comparison.

As described above, the non-CP OFDM symbols 211, 212, 213, 214, and 215 are transmitted are transmitted in the respective non-CP OFDM symbol transmission durations.

Referring to FIG. 2B, the transmission of the first non-CP OFDM symbol 211 starts at time t22 and ends at time t23, and the transmission of the second non-CP OFDM symbol 212 starts at time t23 and ends at time t24. The transmission of the fifth non-CP OFDM symbol 215 starts at time t26 and ends at time t27. Accordingly, the non-CP OFDM symbol transmission period 280 is equal to the sum of the transmission time durations of the five symbols, i.e. from t22 to t27. The symbol transmission duration refers to the non-CP OFDM symbol transmission duration.

Each of the FBMC symbols 220b, 230b, 240b, 250b, and 260b with the overlapping factor L=5 are formatted in the form of 5 concatenated non-CP OFDM symbols transmitted in the 5 non-CP symbol transmission duration. The transmission of the first FBMC symbol 220b starts at time t20 and ends at time t25, and the transmission of the second FBMC symbol 230b starts at time t21 and ends at time t26. The transmission of the fifth FBMC symbol 260b starts at time t24 and ends at time t29. As shown in FIG. 2B, the FBMC symbols are overlapped consecutively in time. During the period between t21 and t28, at least two data symbols are overlapped in one data symbol duration. At least three data symbols are overlapped in one data symbol duration during the period between t22 and t27, at least four data symbols are overlapped in one data symbol duration during the period between t23 and t26, and at least five data symbols are overlapped in one data symbol duration during the period between t24 and t25. If a large amount of data is to be transmitted, for example if data symbols of which each is equal in size to the a non-CP OFDM symbol are transmitted consecutively, then five data symbols are overlapped in the most time period as in the period between t24 and t25.

If the FBMC symbols with the overlapping factor L=5 are transmitted as described above, the FBMC symbol transmission period is elongated by as much as 2 non-CP OFDM symbols at the beginning and end of the duration of Equation 1, respectively, in comparison to the non-CP OFDM symbol transmission period. This means that although the FBMC symbols with the overlapping factor L=5 are overlapped consecutively, the FBMC symbol transmission period is longer than the non-CP OFDM symbol transmission period by as much as 4 non-CP OFDM symbols. The transmission duration increases by as much as the sum of the duration between t20 and t22 and the duration between t27 and t29.

In the case of transmitting the FBMC symbols as above, transmission time loss which depends on the overlapping factor occurs as compared to the non-CP OFDM symbol transmission. Such loss increases as the number of repeated symbols increases. However, assuming a situation where the time is elongated infinitely for continuous transmission, the non-CP OFDM symbol transmission efficiency becomes approximately equal to FBMC symbol transmission efficiency.

Recent wireless communication systems are configured such that the transmission and reception alternate in time one the same frequency band. For example, LTE supports the time division duplex (TDD) mode. In the TDD mode, the FBMC symbol transmission efficiency drops significantly. The description thereof is made with reference to FIG. 3A.

Figure 3A:
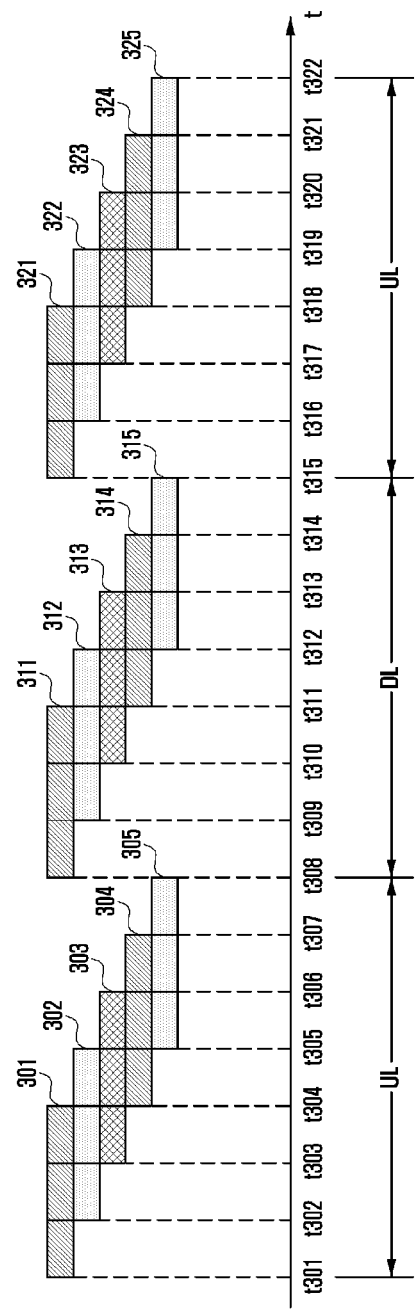
FIG. 3A is a diagram explaining transmission timings of FBMC symbols in a time division duplex (TDD) mode according to an embodiment of the present disclosure.

FIG. 3A is a diagram explaining transmission timings of FBMC symbols in the TDD mode according to an embodiment of the present a disclosure.

Referring to FIG. 3A, the transmission timing of the FBMC symbols with the overlapping factor L=3 in the TDD mode in which the uplink (UL) transmission and the downlink (DL) transmission alternate in time are shown.

The transmission of the first UL FBMC symbol 301 starts at time t301 and ends at time t304. The transmission of the second UL FBMC symbol 302 starts at time t302 and ends at time t305. The transmission of the last UL FBMC symbol 305 starts at time t305 and ends at time t308.

The transmission of the first DL FBMC symbol 311 starts at time t308 and ends at time t311. The transmission of the second DL FBMC symbol 312 starts at time 309 and ends at time t312. The transmission of the last DL FBMC symbol 315 starts at time t312 and ends at time t315.

The transmission of the first UL FBMC symbol 321 starts at time t315 and ends at time t318. The transmission of the second UL FBMC symbol 322 starts at time t316 and ends at time t319. The transmission of the FBMC symbol 325 as the last UL symbol starts at time t319 and ends at time t322.

In the TDD mode, the loss is more significant in transmission efficiency as compared to the situation described above with reference to FIGS. 2A and 2B. For example, the symbols corresponding to the transmission time durations between t301 and t302, between t307 and t309, between t314 and t316, and between t321 and t322 are the cause of degradation of the transmission efficiency in the TDD mode as compared to the non-CP OFDM symbol transmission. As described above, the resource loss increases as the overlapping factor (L) increases.

Figure 3B:
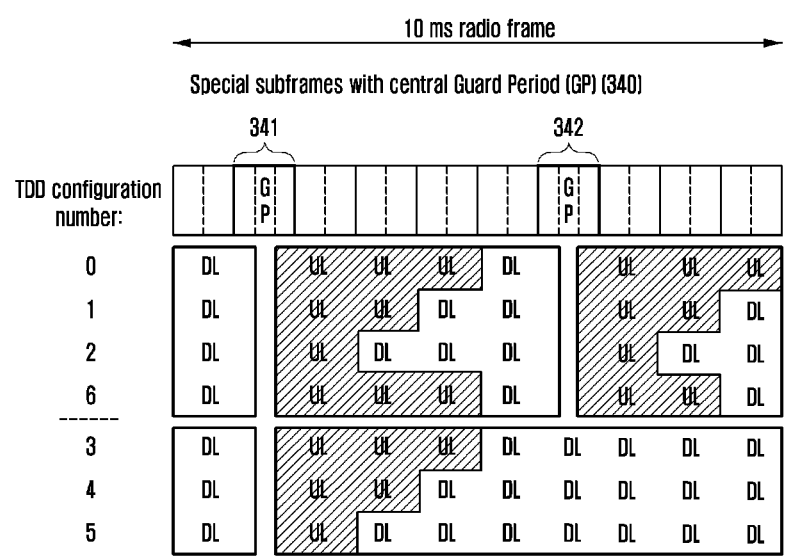
FIG. 3B is a diagram illustrating an operation scenario in an long-term evolution (LTE) system operating in a TDD mode according to an embodiment of the present disclosure.

A description is made of the resource loss depending on the TDD configuration specified in LTE in more detail with reference to FIG. 3B.

FIG. 3B is a diagram illustrating an operation scenario in an LTE system operating in the TDD mode according to an embodiment of the present disclosure.

Referring to FIG. 3B, the 6 TDD configurations specified in LTE are shown. There are TDD configurations 0, 1, 2, 6, 4, and 5. The shaded parts indicate UL durations and the remaining parts indicate DL durations. In LTE, a radio frame spans 10 ms and includes two Guard Periods (GPs) 341 and 342 in which no symbol is transmitted.

A description is made of the case where the FBMC scheme is applied to the LTE system operating in the TDD mode. In the TDD configuration 0, the UL transmission starts at the time when the first GP 341 ends. Accordingly, when transmitting the FBMC symbols at the start time of the UL transmission, it is necessary to transmit extra symbols in comparison to the non-CP OFDM symbol transmission as described above. This is also the case at the time where UL and DL are switched in the TDD configuration 0. Furthermore, the last DL transmission is performed before the second GP 342 and the UL transmission restarts after the second GP 342. Even at this time, it is necessary to transmit extra symbols in comparison to the non-CP OFDM symbol transmission as described above.

Although the description is directed to the TDD configuration 0, the extra symbol transmission is required in other TDD configurations in similar ways.

Such extra symbol transmission decreases symbol transmission efficiency. Table 1 shows the numbers of OFDM symbols and FBMC symbols transmitted in TDD configurations of LTE comparatively.

TABLE 1

| Classification | Number of OFDM symbols | | Number of symbols in FBMC mode | | |
|---|---|---|---|---|---|
| | | | L = 3 | L = 4 | L = 5 |
| TDD configuration #0, 1, 2, 6 | Normal CP | 112 | 112 | 108 | 104 |
| | Extended CP | 96 | | | |

TABLE 1-continued

| Classification | Number of OFDM symbols | | Number of symbols in FBMC mode | | |
|---|---|---|---|---|---|
| | | | L = 3 | L = 4 | L = 5 |
| TDD configuration #3, 4, 5 | Normal CP | 126 | 131 | 129 | 127 |
| | Extended CP | 108 | | | |

Table 1 shows that the number of symbols that can be transmitted decreases gradually as the value of the overlapping factor (L) increases in the FBMC mode. In the TDD configurations 0, 1, 2 and 6, if the overlapping factor (L) is equal to or greater than 4, the number of FBMC symbols that can be transmitted is greater than the number of OFDM symbols with the normal CP. This means that it is difficult to expect the improvement of transmission efficiency if the FBMC scheme is applied to the LTE system in the TDD mode.

A description is made of a method for solving this problem below.

The FBMC symbols comprised of different data symbols may be transmitted while being overlapped as described above. In the case of FIG. 3A, the UL FBMC symbols 301 and 302 comprise different data symbols that are transmitted while being overlapped. In this way, the different FBMC symbols are transmitted while being overlapped. In the present disclosure, the FBMC symbol without truncated part is referred to as non-transient symbol, and the time duration corresponding to the non-transient symbol is referred to as non-transient symbol transmission duration or non-transient transmission duration. The non-transient symbol duration may correspond to the symbols transmitted in the period starting after the symbol length of Equation 1 as described above from the UL or DL transmission start time point and before the symbol length of Equation 1 from UL or DL transmission end time point.

A description is made of the non-transient symbol or non-transient symbol transmission duration below.

The duration starting from the UL or DL start time in which the FBMC symbols are not overlapped or, although overlapped, the overlapped part is truncated according to the present disclosure is referred to as "pre-transient symbol transmission duration" or "pre-transient transmission duration". Such a pre-transient symbol transmission duration or pre-transient transmission duration may be the symbol duration starting at the UL or DL transmission start time and ending at the end of symbol length of Equation 1. The pre-transient symbol and pre-transient symbol transmission duration are clarified in the following description of the present disclosure.

The time duration starting from the end point of the UL or DL in which the FBMC symbols are not overlapped and, although overlapped, the overlapped part is truncated according to the present disclosure is referred to as "post-transient time", and the transmission time duration of the symbols transmitted at the post-transient time is referred to as post-transient symbol transmission duration or post-transient transmission duration. The pre-transient symbol transmission duration or post-transient transmission duration may be the symbol duration starting from the end of the UL or DL transmission to the length of the symbol preceding by as much as symbol length of Equation 1 as described above. The post-transient symbol and post-transient symbol transmission duration are clarified below.

The pre-transient (symbol) transmission duration and post-transient (symbol) transmission duration may be generally referred to as 'transient (symbol) transmission duration' without distinction.

It should be noted that the above-defined terms are provided to help understanding the present disclosure and do not limit the scope of the present disclosure.

Figure 4A:
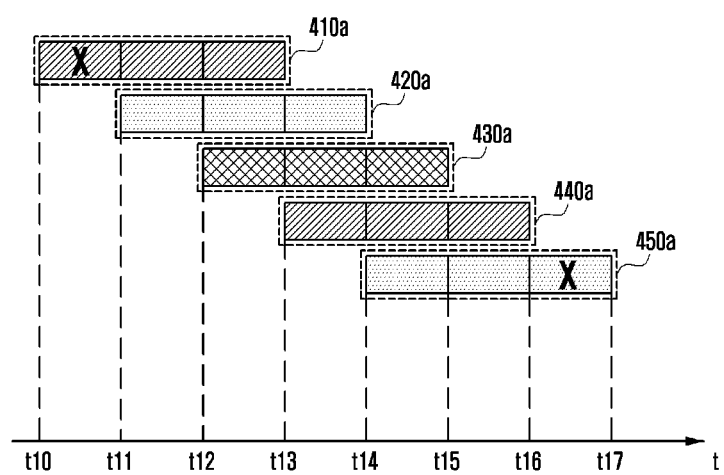
FIGS. 4A and 4B are timing diagrams illustrating a transmission timing for improving FBMC symbol transmission efficiency according to an embodiment of the present disclosure.
Figure 4B:
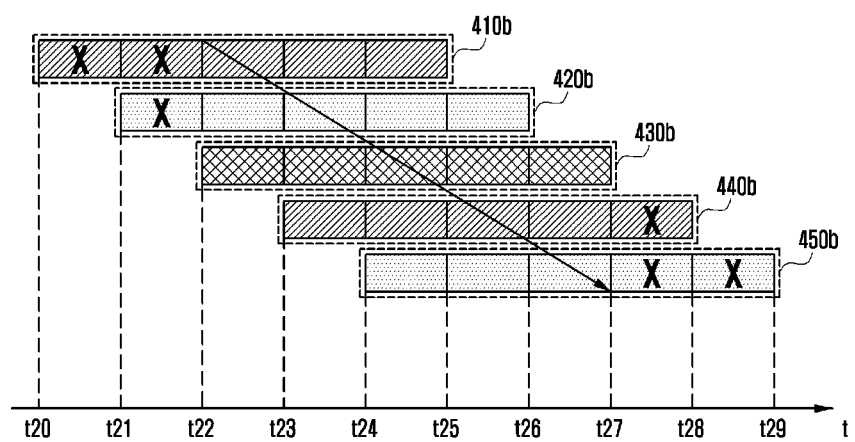

FIGS. 4A and 4B are timing diagrams illustrating a transmission timing for improving FBMC symbol transmission efficiency according to an embodiment of the present disclosure.

Referring to FIG. 4A, the transmission timings of the overlapped FBMC symbols 410a, 420a, 430a, 440a, and 450a with the overlapping factor L=3. Originally, the transmission of the first FBMC symbol 410a starts at time t10 and ends at time t13. However, the duration between t10 and t13 is an extra duration for FBMC transmission in comparison to the non-CP OFDM symbol transmission. Since the pre-transient symbol has the overlapping factor L=3 based on Equation 1, the value is 1. The symbol duration in which the first symbol is transmitted without being overlapped before the duration between t10 and t11 is the pre-transient symbol duration.

The pre-transient symbol of the FBMC symbol with the overlapping factor L=3 is the first data symbol of the FBMC symbol 410a, and the pre-transient duration may be the first symbol transmission duration, (i.e., the duration between t10 and t11). Accordingly, as the simplest method, it can be considered to truncate part of the FBMC symbol which is supposed to be transmitted in the pre-transient duration. In present disclosure, the data symbol positioned in the duration between t10 and t11 in the first FBMC symbol with the overlapping factor L=3 is truncated. The data symbols truncated in pre-transient transmission duration of the first FBMC symbol is marked "X" as shown in FIG. 4A.

The subsequent FBMC symbols (i.e., the second FBMC symbol 420a, the third FBMC symbol 430a, the fourth FBMC symbol 440a, and the fifth FBMC symbol 450a), are transmitted without truncation of their first data blocks.

The last FBMC symbol 450a (i.e., the fifth FBMC symbol), should be transmitted in the duration between t14 and t17. However, as described above, if the post-transient duration is calculated using Equation 1, it is equal in length to one non-CP OFDM symbol like the pre-transient duration. The pre-transient duration causes transmission loss in comparison to the non-CP OFDM symbol as described above. The simple method of overcoming this problem is to truncate the data symbol positioned in the last post-transient duration between t16 and t17. The post-transient duration of the fifth FBMC symbol is marked with "X" to indicate that the corresponding data symbol is truncated.

By truncating the data symbols of the pre-transient transmission duration and post-transient transmission duration, the transmission efficiency of the FBMC mode becomes equal to that of the non-CP OFDM mode of FIG. 2A. If data symbols are truncated in the pre-transient transmission duration and post-transient transmission duration as shown in FIG. 4A, it becomes possible to transmit the FBMC symbols in the same duration as the non-CP OFDM symbols. A description is made of the case where the overlapping factor L is greater than 3 below.

Referring to FIG. 4B, the transmission timings of the overlapped FBMC symbols with the overlapping factor L=5 are shown. Originally, the transmission of the first FBMC symbol 410b starts at time t20 and ends at time t25. In the present disclosure, however, the data symbols positioned in the time duration between t20 and t22 in the first FBMC symbol are truncated. Applying Equation 1, the pre-transient duration becomes 2 because the overlapping factor is 5. Accordingly, the pre-transient duration is between t20 and t22. As a result, the first data symbol of the second FBMC symbol 420b which corresponds to the time duration between t21 and t22 as a part of the pre-transient transmission duration is truncated.

In the case of FIG. 4B, the third FBMC symbol 430b is positioned within the non-transient transmission duration and thus transmitted without truncation. Since the FBMC symbol located within the non-transient transmission duration is not overlapped with any of the pre-transient transmission duration and post-transient transmission duration, the FBMC symbol can be transmitted entirely.

The fourth FBMC symbol 440b and the fifth FBMC symbol 450b (i.e., the last FBMC symbol), has the data symbols positioned in the post-transient transmission duration between t27 and t29 respectively such that the data symbols positioned in the post-transient transmission duration are truncated. The data symbols truncated in the transient transmission durations are marked with "X" in FIG. 4B.

By truncating the data symbols located in the pre-transient transmission duration and post-transient transmission duration, it is possible to make the FBMC transmission efficiency equal to the non-CP OFDM symbol transmission efficiency.

As described above, the lengths of the pre-transient transmission duration and post-transient transmission duration vary depending on the overlapping factor (L). The pre-transient transmission duration and post-transient transmission duration are equal to one non-CP OFDM symbol when the overlapping factor (L) is 3 and two non-CP OFDM symbols when the overlapping factor (L) is 5

The effect of truncation of data symbols in the pre-transient transmission duration and post-transient transmission duration as shown in FIGS. 4A and 4B while using the transmission filter in the FBMC system is described below.

Figure 5A:
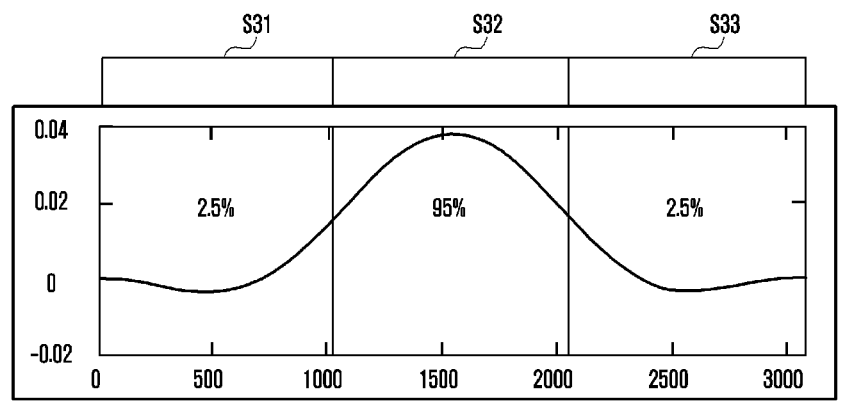
FIGS. 5A and 5B are graphs illustrating a change of energy distribution in a symbol according to an overlapping factor in a case of using a filter widely used in the FBMC system according to an embodiment of the present disclosure.
Figure 5B:
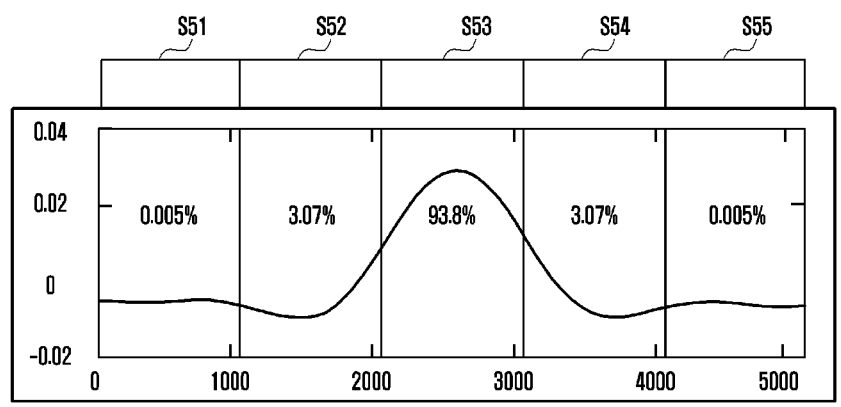

FIGS. 5A and 5B are graphs illustrating change of energy distribution in a symbol according to an overlapping factor in a case of using a filter widely used in an FBMC system according to an embodiment of the present disclosure.

Referring to FIG. 5A, in the FBMC system with the overlapping factor L=3, the FBMC symbol consists of three data symbols: first data symbol S31, second data symbol S32, and third data symbol S33. In the case of generating the FBMC symbol with the transmission filter used widely in the FBMC system, the total energy is distributed such that the second data symbol S32 has 95% of the total energy and the first and third symbol durations S31 and S33 have 2.5% of the total energy respectively. Accordingly, it is expected that truncating the first data symbol S31 positioned in the pre-transient transmission duration would not significantly affect the integrity of the FBMC symbol.

In the following description, the characteristic in which 90% or about 90% of the given energy is concentrated in the center symbol duration and the energy is distributed symmetrically with a single central peak of energy is referred as "symmetric distribution with a central peak". The central symmetric energy distribution may vary depending on the overlapping factor (L) and is caused by the filter characteristic. The energy distribution may be designed so as not to be symmetrical around the center but biased toward one side depending on the characteristic of the filter.

Referring to FIG. 5B, in the FBMC system with the overlapping factor L=5, the FBMC symbol consists of five data symbols: first data symbol S51, second data symbol S52, third data symbol S53, fourth data symbol S54, and fifth data symbol S55. In the case of generating the FBMC symbol with the transmission filter used widely in the FBMC system, the energy is distributed such that the first and fifth symbol durations S51 and S55 are assigned 0.005% of the energy respectively, the second and fourth symbol durations S42 and 54 are assigned 3.07% of energy respectively, and the third symbol duration are assigned 93.8% energy. Accordingly, it is expected that truncating the first and second data symbols S51 and S52 positioned in the pre-transient transmission duration or the fourth and fifth data symbols S54 and 55 positioned in the post-transient transmission duration may affect little the integrity of the FBMC symbol The FBMC symbol is characterized by center-concentrated symmetric energy distribution as shown in FIG. 5B. The energy distribution symmetric around the center is based on the filter characteristic.

The relationship between the interface amount of each FBMC symbol and the overlapping factor is described below.

Figure 6A:
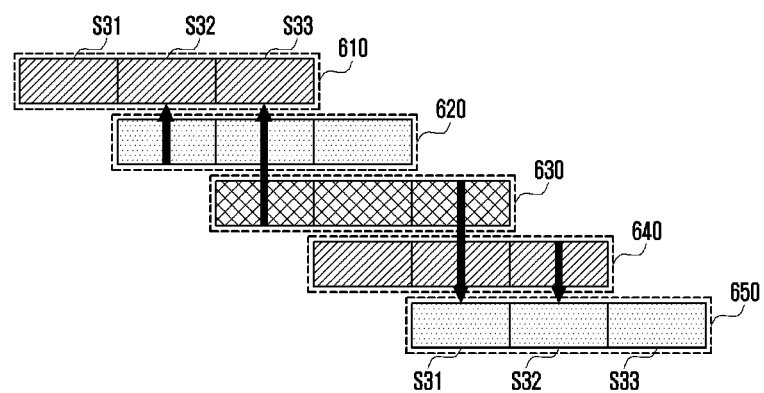
FIG. 6A is a conceptual diagram explaining inter-symbol interference in a pre-transient transmission duration and post-transient transmission duration in an FBMC system with an overlapping factor L=3 according to an embodiment of the present disclosure.

FIG. 6A is a conceptual diagram explaining inter-symbol interference in a pre-transient transmission duration and post-transient transmission duration in an FBMC system with an overlapping factor L=3 according to an embodiment of the present disclosure.

Referring to FIG. 6A, the first FBMC symbol 610 consists of the first data symbol S31, second data symbol S32, and the third data symbol S33. In this case, the first data symbol is not affected by any interference. The second data symbol S32 of the first FBMC symbol 610 is affected by the interference of the first data symbol of the second FBMC symbol 620, and the third data symbol S33 of the first FBMC symbol 610 is affected by the second data symbol of the second FBMC symbol 620 and the first data symbol of the third FBMC symbol 630.

The first data symbol S31 of the last FBMC symbol 650 is affected by the interference of the last data symbol of the third FBMC symbol 630 and the second data symbol of the fourth FBMC symbol 640, and the second data symbol S32 of the last FBMC symbol 650 is affected by the interference of the last data symbol of the fourth FBMC symbol 640. The third data symbol S33 of the last FBMC symbol 650 is not affected by any interference.

Figure 6B:
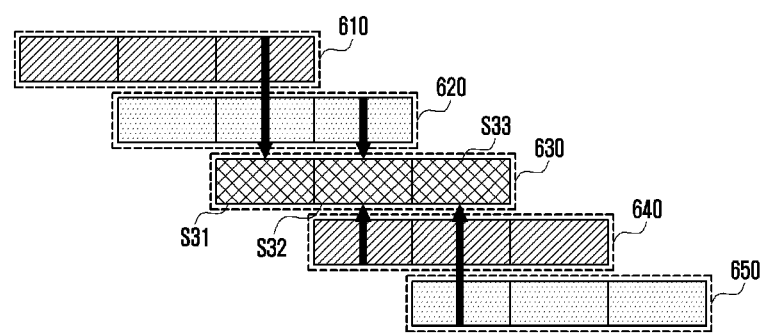
FIG. 6B is a conceptual diagram explaining inter-symbol interference in a non-transient duration in an FBMC system with an overlapping factor L=3 according to an embodiment of the present disclosure.

FIG. 6B is a conceptual diagram for explaining inter-symbol interference in the non-transient duration in the FBMC system with the overlapping factor L=3 according to an embodiment of the present disclosure.

Referring to FIG. 6B, the third FBMC symbol 630 positioned in the non-transient transmission duration consists of the first data symbol S31, second data symbol S32, and third data symbol S33. The first data symbol S31 of the third FBMC symbol 630 is affected by the interference of the last data symbol of the first FBMC symbol 610 and the second data symbol of the second FBMC symbol 620. The second data symbol S32 of the third FBMC symbol 630 is affected by the interference of the last data symbol of the second FBMC symbol 620 and the first data symbol of the fourth FBMC symbol 640. The last data symbol S33 of the third FBMC symbol 630 is affected by the second data symbol of the fourth FBMC symbol 640 and the first data symbol of the last FBMC symbol 650.

Regarding the interferences from the last data symbol of the first FBMC symbol 610 and the second data symbol of the second FBMC symbol to the first data symbol S31 of the third FBMC symbol 630 as a single interference and the interferences from the second data symbol of the fourth FBMC symbol 640 and the first data symbol of the last FBMC symbol 650 to the last data symbol S33 of the third FBMC symbol as a single interference, the FBMC symbol positioned in the non-transient transmission duration is affected by the interferences of the four neighboring FBMC symbols during the whole FBMC symbol duration. In the duration where the FBMC symbols are overlapped, the FBMC symbols interfere with each other.

In the first embodiment of the present disclosure, truncating some data symbols positioned in the pre-transient transmission duration and post-transient transmission duration may cause performance degradation as described above. The description thereof is made with reference to accompanying drawings.

Figure 7:
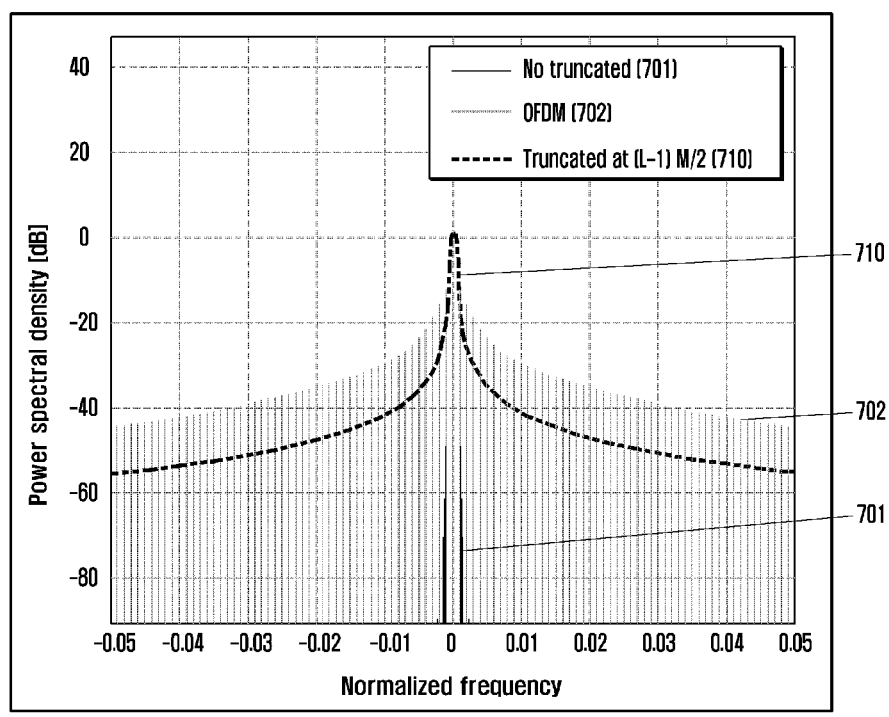
FIG. 7 is a graph illustrating simulation result of kurtosis of power spectrum in a given frequency band when data symbol(s) of an FBMC symbol is truncated in a pre-transient transmission duration and post-transient transmission duration according to an embodiment of the present disclosure.

FIG. 7 is a graph illustrating simulation result of kurtosis of power spectrum in a given frequency band when data symbol(s) of an FBMC symbol is truncated in a pre-transient transmission duration and post-transient transmission duration according to an embodiment of the present disclosure.

Referring to FIG. 7, reference numbers 701 denotes the kurtosis when the normal FBMC symbols are transmitted, reference number 702 denotes power distribution when the OFDM symbols are transmitted, and reference number 710 denotes the kurtosis when the FBMC symbols from which data symbols positioned in the transient transmission durations are truncated are transmitted. As shown in FIG. 7, the normal FBMC symbol (i.e., the FBMC symbol from which no data symbol is truncated in any of the pre-transient transmission duration and post-transient transmission duration), has a characteristic of no energy distribution to neighboring frequency bands. The OFDM symbol is characterized by widespread energy distribution to the neighboring frequency bands as denoted by reference number 702 in contrast to the FBMC symbol.

In the case of transmitting the FBMC symbols from which the data symbols positioned in the pre-transient transmission duration and post-transient transmission duration are truncated, the energy distribution is narrow in comparison to the OFDM symbol transmission but wide in comparison to the normal FBMC symbol transmission as denoted by reference number 710.

If the data symbols positioned in the pre-transient transmission duration and post-transient transmission duration with low power contribution are truncated in this way, the spectrum confinement of the filter is degraded. This may cause loss of the advantage of the FBMC in the guard band.

The present disclosure proposes an apparatus and method for protecting against performance degradation in the spectrum even when truncation is performed in the pre-transient transmission duration and post-transient transmission duration. The present disclosure also proposes a method for protecting against degradation of spectral confinement and reducing the length of the filter by truncating the pre-transient transmission duration and post-transient transmission duration without causing significant problem.

The method according to an embodiment of the present disclosure is characterized in that a transmission signal waveform for the transient transmission durations is separately designed to secure high symbol transmission rate and good spectral confinement characteristic if there is little loss in performance.

An embodiment of the present disclosure is directed to the improvement of both the symbol transmission rate and gain in the guard band by using the newly designed transmission signal waveform. In order to accomplish this, an embodiment of the present disclosure uses various techniques.

A first technique is to truncate part of the FBMC symbol (e.g., the whole or a part of the pre-transient transmission duration and post-transient transmission duration), to improve symbol transmission rate. The second technique is to reconfigure the filter to be suitable for the truncated part so as to protect against spectral confinement degradation problem.

Figure 8:
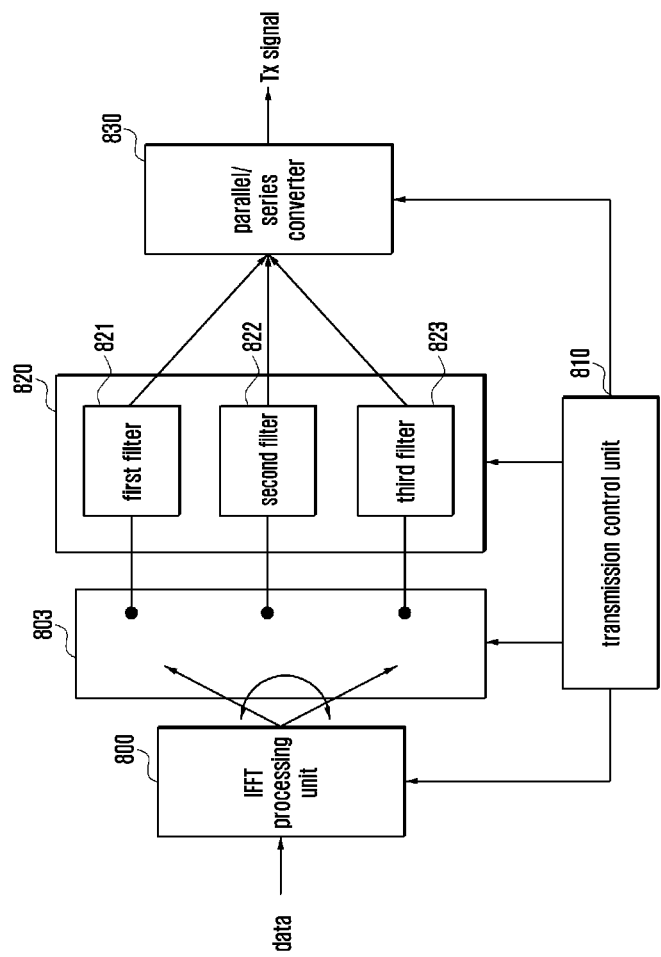
FIG. 8 is a block diagram illustrating a configuration of an FBMC symbol transmitter according to an embodiment of the present disclosure.

FIG. 8 is a block diagram illustrating a configuration of an FBMC symbol transmitter according to the second embodiment of the present disclosure.

Referring to FIG. 8, the data to be transmitted are input to the IFFT processing unit 800. The IFFT processing unit 800 performs IFFT on the input data under the control of the transmission control unit 810. The data output from the IFFT processing unit 800 are input to the filter unit 820 via the switch 803.

The filter unit 820 may be configured in various forms according to the overlapping factor (L). FIG. 8 shows a configuration of the filter unit comprised of 3 different filters. For example, the first filter 821 may output a data symbol according to the energy distribution characteristic for the pre-transient transmission duration. The second filter 822 may output a data symbol according to the energy distribution characteristic for the non-transient transmission duration. Finally, the third filter 823 may output a data symbol according to the energy distribution characteristic for the post-transient transmission duration. The operations and characteristics of the filters 821, 822, and 823 of the filter unit 820 are described below with reference to accompanying drawings.

The filter unit 820 processes the FBMC symbols input to the filters 821, 822, and 823 to have the respective energy distribution characteristics under the control of the transmission control unit 810.

The parallel/serial conversion unit 830 converts the data input in parallel by the respective filters to signals in series. The signals output in series are transmitted over a radio frequency (RF) carrier.

The switch 803 or filter unit 820 may be responsible for truncating the signals (symbols) to be transmitted in the pre-transient transmission duration and/or post-transient transmission duration among the symbols output by the IFFT processing unit 800. The filters 821 and 823 which output the symbols to be transmitted in the transient transmission periods, among the filters 821, 822, and 823 of the filter unit 820, may be designed to truncate the corresponding symbols. The filters 821 and 823 which output the transient duration symbols are designed to change the energy distribution as described below according to the present disclosure.

Figure 9:
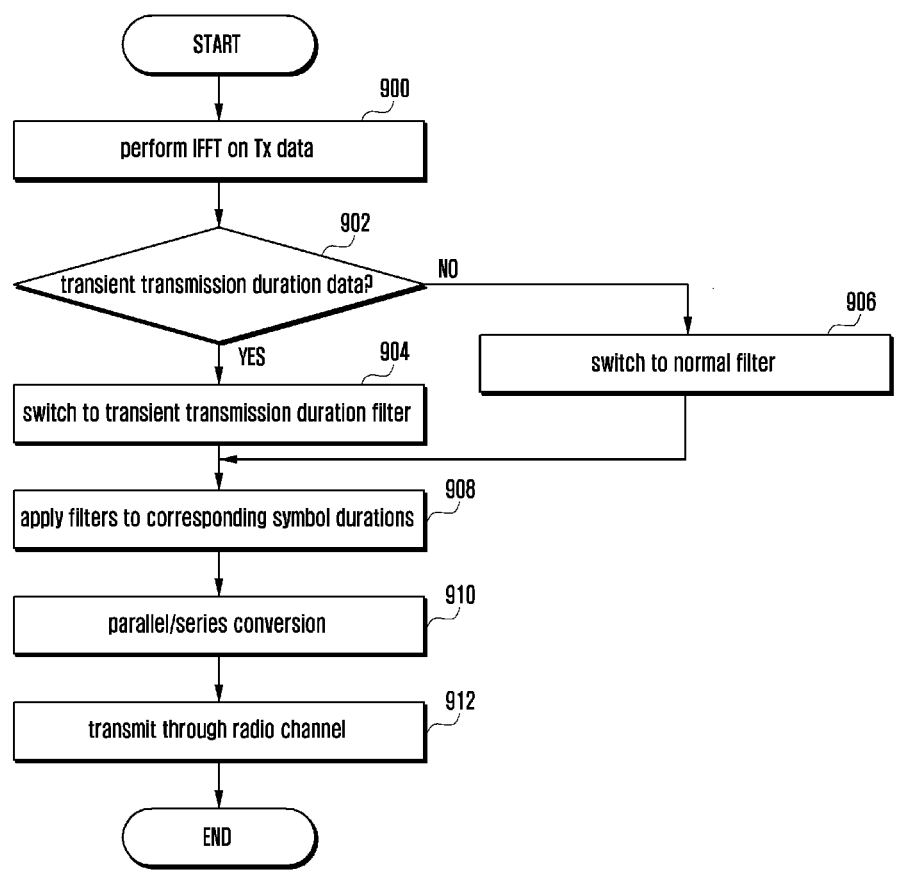
FIG. 9 is a flowchart illustrating a transmission signal processing procedure according to an embodiment of the present disclosure.

FIG. 9 is a flowchart illustrating a transmission signal processing procedure according to a second embodiment of the present disclosure.

Referring to FIG. 9, the transmission control unit 810 controls the IFFT processing unit 800 to perform IFFT on the data to be transmitted at 900. Next, the transmission control unit 810 determines whether the data output from the IFFT processing unit 800 are the transient transmission duration data at operation 902. If the data are the transient transmission duration data (i.e., the data to be transmitted in the pre-transient transmission duration or post-transient transmission duration), the transmission control unit 810 controls the switch 803 to switch the data to the corresponding filter at operation 904. As a result, the data output from the IFFT processing unit 800 are input to the corresponding filters for transient transmission duration or non-transient transmission duration. As described with reference to FIG. 8, if the data symbol output from the IFFT processing unit 800 is the symbol corresponding to the pre-transient transmission duration, the data symbol is switched so as to be input to the first filter 821; and if the data symbol output from the IFFT processing unit 800 is the symbol corresponding to the post-transient transmission duration, the data symbol is switched so as to be input to the third filter 823.

If the data output from the IFFT processing unit 800 are not the transient transmission duration data, i.e. if the data are non-transient transmission duration data, at operation 902, the transmission control unit 810 controls the switch 803 to switch the data so as to be input to a normal filter, e.g. the second filter 822, at operation 906.

If the corresponding data are input to the first to third filters 821, 822, and 823, the transmission control unit 810 controls the filters 821, 822, and 823 to output the data symbols with the energy distribution characteristics for the FBMC symbol at operation 908. In the case that the transient transmission duration symbol truncation is performed at the filter unit 820, the filters 821 and 823 may truncate the data symbols positioned in the transient transmission durations under the control of the transmission control unit 810.

The transmission control unit 810 controls the parallel/series conversion unit 830 to perform parallel/series conversion on the data symbols to which the respective energy distribution characteristics are added by the filters 821, 822, and 823 to output the symbols in series at operation 910. The data symbols output in series are transmitted over the air channel at operation 912 as shown in FIG. 4A or 4B.

The characteristics of the filters 821, 822, and 823 are described below.

FIGS. 10A to 10E are graphs illustrating energy distributions in cases of transmitting FBMC symbols with an overlapping factor L=5 with and without truncating transient transmission duration symbols according to an embodiment of the present disclosure.

Figure 10A:
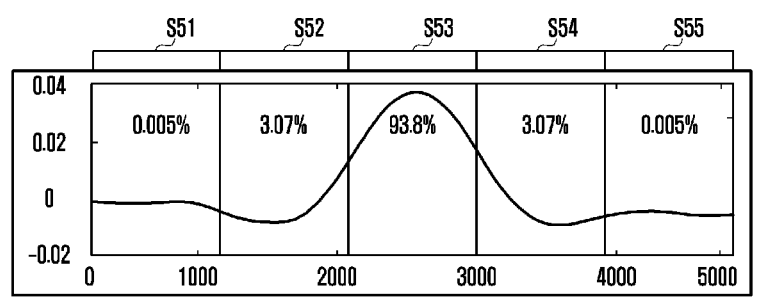
FIGS. 10A, 10B, 10C, 10D, and 10E are graphs illustrating energy distributions in cases of transmitting FBMC symbols with the overlapping factor L=5 with and without truncating transient transmission duration symbols according to an embodiment of the present disclosure.

Referring to FIG. 10A, the FBMC symbol with the overlapping factor L=5 consists of 5 data symbols S51, S52, S53, S54, and S55 and, in the case of applying the filter used widely in the FBMC system, the energy distributions in the respective symbol durations are 0.005%, 3.07%, 93.8%, 3.07%, and 0.005%. The graph of FIG. 10A shows the symmetrical distribution of energy with a single central peak.

Figure 10B:
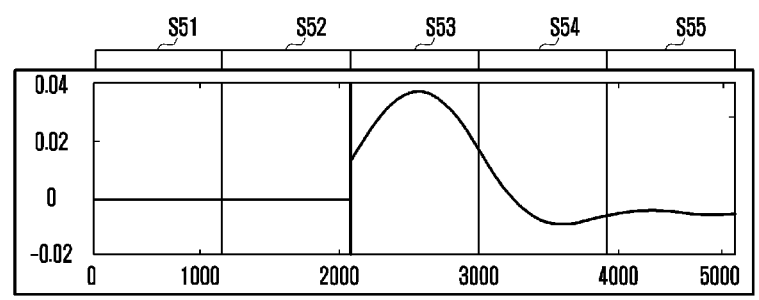

FIG. 10B shows energy distribution in a FBMC symbol when two data symbols are just truncated in the pre-transient transmission duration (i.e., data symbols S51 and S52). In the case of FIG. 10B, the data symbols are truncated in the pre-transient transmission duration without change of the filter characteristics. As shown in the graph of FIG. 10B, since the data symbols S51 and S52 of the FBMC symbol are truncated in the pre-transient transmission duration, the energy level at the corresponding symbol durations is 0. In the case of just truncating one or two data symbols without change of filter characteristics, this may cause problem in spectral confinement as described above.

Figure 10C:
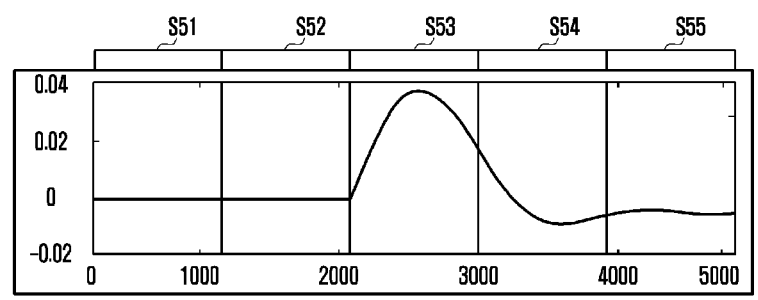

FIG. 10C shows energy distribution in a FBMC symbol of which the two data symbols are truncated and the characteristics of the filters corresponding to non-truncated data symbol durations are changed.

Referring to FIG. 10C, since the first and second data symbols S51 and S52 of the FBMC symbol with the overlapping factor L=5 are truncated, the energy level at the corresponding symbol durations is 0. Although the energy distribution has to appear as shown in FIG. 10B because the data symbols preceding the data symbol S53 are truncated, the change of filter characteristics makes the energy level change smoothly as shown in FIG. 10C. Since the data symbols are truncated in the pre-transient transmission duration, the first filter 821 of FIG. 8 is used for data symbol truncation. The method of truncating the data symbol in the pre-transient transmission duration by means of the first filter 821 and changing the filter characteristic to smooth the change of energy level is described with reference to accompanying drawings.

Figure 10D:
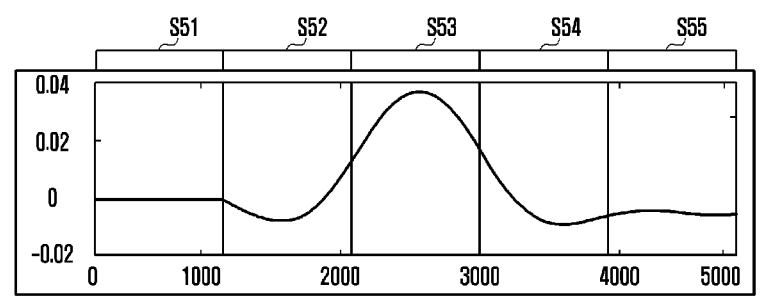

FIG. 10D shows energy distribution in a FBMC symbol of which one data symbol is truncated in the pre-transient transmission duration according to an embodiment of the present disclosure.

Referring to FIG. 10D, in the case of using the filter widely used in the FBMC system and truncating only the data symbol S51 of the FBMC symbol, the FBMC symbol transmission time is longer than the non-CP OFDM symbol transmission time as much as one non-CP OFDM symbol. Accordingly, there may be transmission time loss, but it is possible to improve transmission efficiency in view of kurtosis. In the case of FIG. 10D, it may be the case of the second FBMC symbol 420*b*. The second FBMC symbol 420*b* has to be filtered such that the first data S51 equal in size to one non-CP OFDM symbols is truncated. This is the case where the filter characteristic is changed such that the energy changes more smoothly in the data symbol S52 following the truncated data symbol, as described above.

Figure 10E:
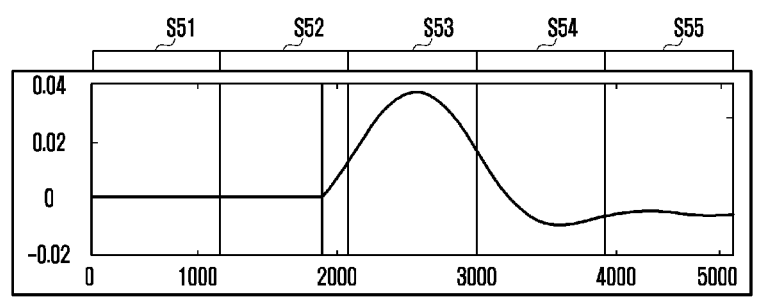

FIG. 10E shows energy distribution in a FBMC symbol of which the data symbols are partially truncated according to an embodiment of the present disclosure.

Referring to FIG. 10E, unlike the above-described embodiments of FIG. 10B to FIG. 10D where the truncation is performed by non-CP OFDM symbol, i.e. overlapping factor-based duration, the truncation is performed regardless of the boundaries of the data symbols in the embodiment of FIG. 10E.

Referring to FIG. 10E, the first data symbol S51 and part of the second data symbol S52 are truncated. The truncation target part of the second data symbol S52 may be determined by the start time point of the second data symbol S52 and the time point when the power level becomes 0 before the start time point of the third data symbol S53 in the waveform. The time point when the power level becomes 0 in the waveform may be found between about ¼ and ⅕ time points of the second data symbol S52. In the case of changing the characteristic of the filter, the time point when the power level becomes 0 in the corresponding waveform may change depending on the filter. In the case that a data symbols is truncated partially as shown in FIG. 10E, the FBMC symbol transmission time may be longer a little than the non-CP OFDM symbol transmission time, but the FBMC symbol transmission may improve the transmission efficiency in view of the kurtosis.

Figure 10F:
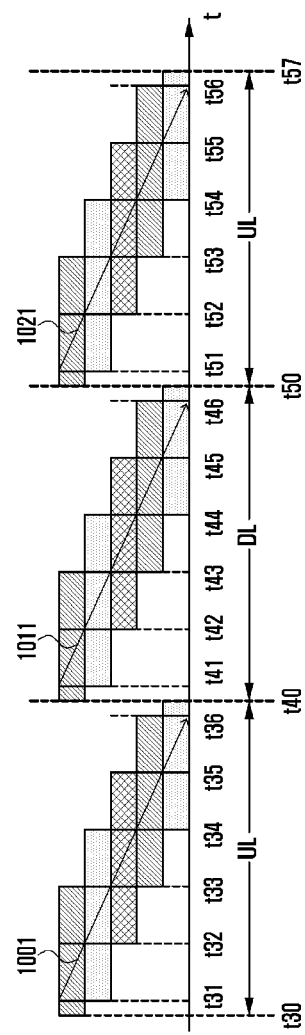
FIG. 10F is a timing diagram illustrating transmission timings of FBMC symbols in an FBMC system operating in a TDD mode with the truncation scheme of FIG. 10E according to an embodiment of the present disclosure.

FIG. 10F is a timing diagram illustrating transmission timings of FBMC symbols in the FBMC system operating in the TDD mode with truncation scheme of FIG. 10E. FIG. 10F shows a case where the data symbols are truncated as shown in FIG. 10E in the FBMC system operating in the TDD mode. In FIG. 10F, the first UL duration is defined between t30 and t40, the subsequent DL duration between t40 and t50, and the subsequent UL duration between t50 and t57. In the UL and DL durations, the diagonal arrows 1001, 1011, and 1021 are crossing the data symbol durations with the highest energy level.

Referring to FIG. 10F, the first UL duration has a data symbol duration which is longer than one non-CP OFDM symbol. For example, a part of the pre-transient transmission duration between t30 and t31 and a part of the post-transient transmission duration are used for FBMC symbol transmission.

The reason why the FBMC transmission is performed as shown in FIG. 10F is that the truncation is performed not in unit of data symbol (i.e. non-CP OFDM symbol) but in consideration of the time point when the power level becomes 0 in the energy level graph within the FBMC symbol as described with reference to FIG. 10E. In the case of applying the truncation scheme of FIG. 10E, the FBMC transmission shows the best frequency selectivity with the exception of the case of FBMC transmission without truncation. In this case, however, extra transmission is performed up to the time when zero-crossing occurs in the corresponding pre-transient transmission duration as shown in FIG. 10F, resulting loss of transmission efficiency.

As described above, in the case of truncating the data symbols in units of non-CP OFDM symbol length, the receiver performs demodulation and decoding on the FBMC symbols by padding 0s in unit of non-CP OFDM symbol length according to the overlapping factor. In the case that the truncation is performed as shown in FIG. 10E, the receiver has to know the length of the truncated part so as to perform demodulation and decoding on the FBMC symbol by padding 0s correctly.

As described above, FIG. 10A shows the energy distribution in the FBMC symbol generated with the overlapping factor L=5 and the filters widely used in the FBMC system. FIG. 10A shows the energy distribution characteristic required in the filter to be used in the transient period. Accordingly, the waveform corresponding to the non-transient duration may result from the operation of the second filter 822 of FIG. 8. FIGS. 10B to 10E show the energy distributions in the FBMC symbols which are generated all with the overlapping factor L=5 and by truncating data symbol(s) in the pre-transient transmission duration according to various embodiments of the present disclosure. In the embodiments of FIGS. 10B to 10E, the truncation is made in the pre-transient transmission duration. In those cases, the waveforms may result from the operations of the first filter 821 of FIG. 8. In a similar manner, truncation may be made in the post-transient duration. In the case of truncating the data symbol(s) in the post-transient transmission duration, the waveform may result from the operation of the third filter 823 of FIG. 8, and it is apparent that the operation of the first filter 821 can be used to accomplish the operation of the third filter 823.

The energy distribution characteristics and kurtosis of non-CP OFDM symbols in FIG. 10A to FIG. 10E are described in more detail hereinafter with reference to FIG. 11.

Figure 11:
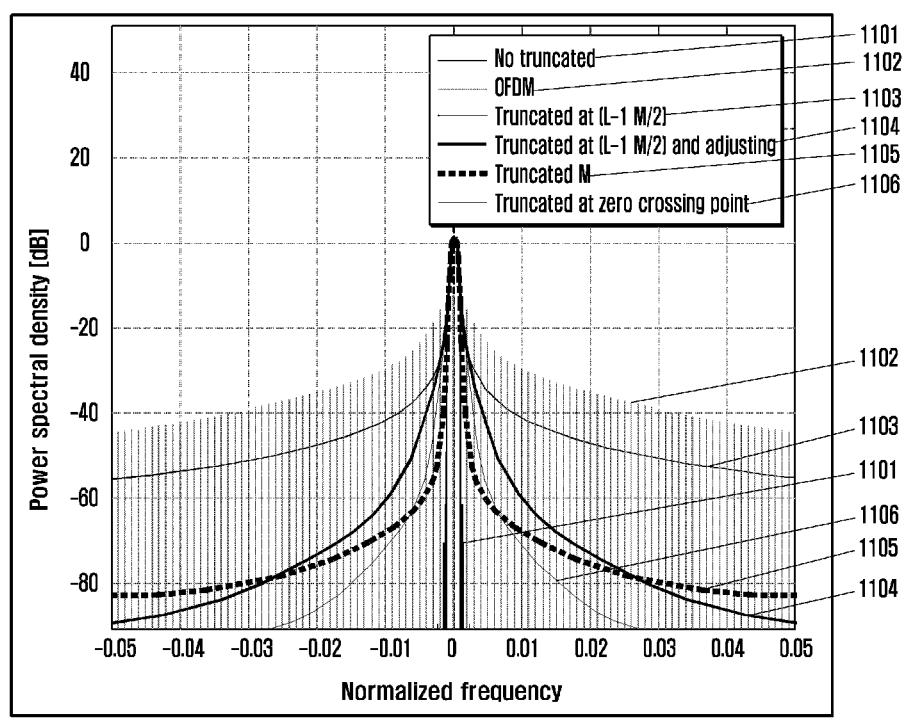
FIG. 11 is a graph illustrating simulation result of kurtosis between normalized frequency and power spectral density in cases of transmitting non-CP OFDM symbols and FBMC symbols configured in the formats of FIGS. 10A to 10E according to an embodiment of the present disclosure.

FIG. 11 is a graph illustrating simulation result of kurtosis between normalized frequency and power spectral density in cases of transmitting non-CP OFDM symbols and FBMC symbols configured in the formats of FIGS. 10A to 10E according to an embodiment of the present disclosure.

Referring to FIG. 11, the frequency selectivity curve 1101 shows that the frequency selectivity is high at the cent frequency in the case that no truncation is made in the FBMC symbol as shown in FIG. 10A. The frequency selectivity curve 1102 of the non-CP OFDM symbol shows that the power spectral density is most widely distributed. In the case of truncating the data symbol(s) of the FBMC symbol in the pre-transient transmission duration as shown in FIG. 10B, the frequency selectivity curve 1103 is better than the frequency selectivity curve 1102 but spread widely.

The frequency selectivity curve 1104 in the case of truncating all data symbols positioned in the pre-transient transmission duration and changing the filter characteristic to make the energy level change smoothly shows that the frequency selectivity is better than that in the FBMC symbol of FIG. 10B.

The frequency selectivity graph 1105 in the case of truncating one data symbol in the pre-transient transmission duration shows that the frequency selectivity is better than those of the other frequency selectivity curves in the cases of truncating the data symbols in the pre-transient transmission duration.

Finally, the frequency selectivity curve 1106 in the case of truncating at the time point when the energy level becomes 0 (i.e., at the zero crossing point), shows the frequency selectivity better than those of the other frequency selectivity curves in the case of FIGS. 10B to 10D.

As shown in FIG. 11, in the case of truncating all or some of the data symbols in the pre-transient transmission duration, the frequency selectivity is better than that in the case of transmitting non-CP OFDM symbols. In the case of selecting one of the schemes of FIGS. 10B to 10E, it is necessary to design a filter based on the waveform appearing in the overlapped duration to minimize ISI.

The above descriptions are directed to the case where the overlapping factor L is an odd number (i.e., 3 and 5). A method for improving FBMC symbol transmission efficiency in the TDD system by changing the characteristics of the filters when the overlapping factor L is 4 is described below.

FIGS. 12A to 12D are diagrams illustrating FBMC symbol transmission with an overlapping factor L=4 and change of filter characteristics according to an embodiment of the present disclosure.

Figure 12A:
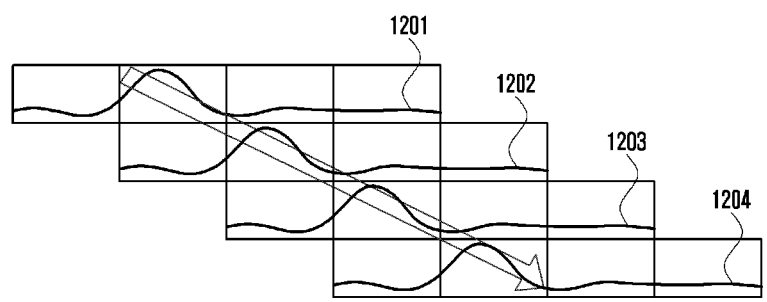
FIGS. 12A, 12B, 12C, and 12D are diagrams illustrating FBMC symbol transmission with an overlapping factor L=4 and a change of filter characteristics according to an embodiment of the present disclosure.
Figure 12B:
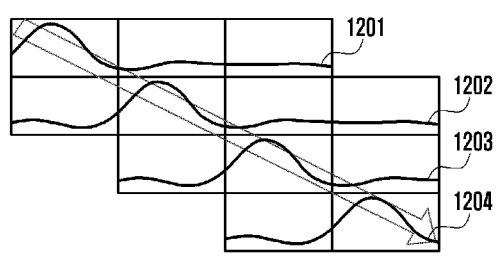

Referring to FIGS. 12A and 12B, the pre-transient transmission duration and post-transient transmission duration may have the length of 1.5 data symbol based on the above-described Equation 1. One data symbol is equal in length to one non-CP OFDM symbol. In the case that the length of the transient transmission duration has no integer value (e.g., 1.5 symbol duration), it may be difficult to perform symbol truncation.

In order to solve this problem, it may be possible to negotiate to use an asymmetric transient transmission durations. For example, it may be possible to agree to use the pre-transient transmission duration equal to the length of one data symbol and the post-transient transmission duration equal to the length of two data symbols or the pre-transient transmission duration equal to the length of two data symbols and the post-transient transmission duration equal to the length of one data symbol. Whether to use the pre-transient transmission duration of one-data symbol length or two-data symbol length may be agreed between the transmitter and receiver in advance, and the two schemes can be used in a similar manner.

FIGS. 12A and 12B are directed to a case where a pre-transient transmission duration has a length of one data symbol and a post-transient transmission duration has a length of two data symbols.

Referring to FIG. 12A, the first to fourth FBMC symbols are configured such that the energy distributions are designed with the filters proposed in the present disclosure as denoted by reference numbers 1201, 1202, 1203, and 1204. As shown in FIG. 12A, the FBMC symbols are configured such that the most energy is concentrated in the second symbol durations, and the FBMC symbols are transmitted in the forms as shown in FIG. 12B. In the following description, if the energy is concentrated in the first half of the FBMC symbol other than at the center of the FBMC symbol, this is referred to as "pre-concentrated type" energy distribution characteristic. The pre-concentrated type energy distribution is characterized in that the energy is concentrated in the first half part followed by the center point of the FBMC symbol as shown in FIG. 12A or as more biased to the start point of the FBMC symbol.

FIG. 12B shows the case where 4 OFDM symbols are overlapped in the case that the overlapping factor L is 4. In FIG. 12B, the first FBMC symbol is transmitted after truncating one data symbol positioned in the pre-transient transmission duration, the third FBMC symbol is transmitted after truncating one data symbol position in the post-transient transmission duration, and the fourth FBMC symbol is transmitted after truncating two data symbols positioned in the post-transient transmission duration. Although the FBMC symbols are transmitted in this way, the spectral distribution characteristic is not degraded unlike the above described first embodiment. This is because the preprocessing is applied to minimize the spectral distribution characteristic degradation caused by energy distribution of the symbols although the whole or part of the first data symbol duration or last data symbol duration.

Figure 12C:
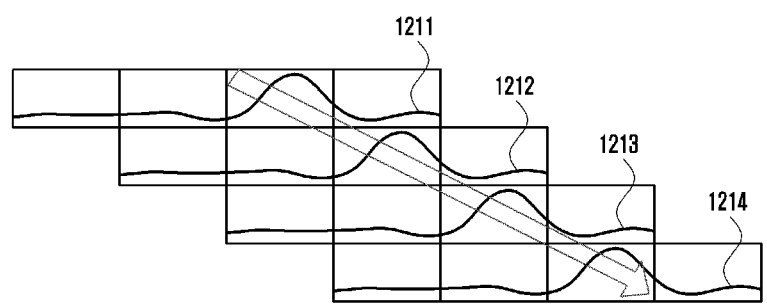
Figure 12D:
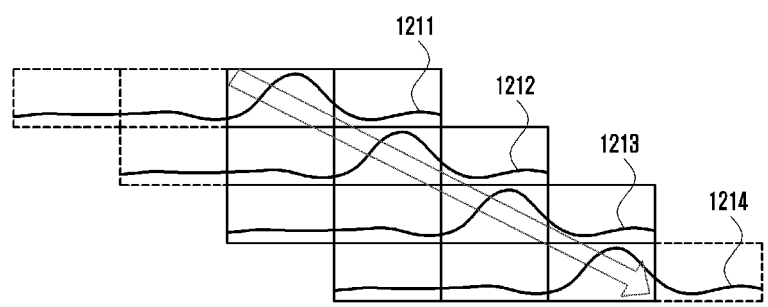

FIGS. 12C and 12D are directed to the case where the pre-transient transmission duration has the length of two data symbols and the post-transient transmission duration has the length of one data symbol. FIG. 12C shows the opposite case of FIG. 12A.

Referring to FIG. 12C, the first to fourth FBMC symbols are modified in energy distribution as denoted by reference numbers 1211, 1212, 1213, and 1214 using the filters according to an embodiment of the present disclosure. The FBMC symbols as shown in FIG. 12C are modified by the filters such that most energy is concentrated in the third symbol durations and then transmitted in the shape as shown in FIG. 12D. In the following description, if the energy is concentrated in the last half of the FBMC symbol other than at the center of the FBMC symbol, this is referred to as "post-concentrated type" energy distribution characteristic. The post-concentrated type energy distribution is characterized in that the energy is concentrated in the last half part following the center point of the FBMC symbol as shown in FIG. 12C or as more biased to the end point of the FBMC symbol.

Since the filter is applied such that the energy level at the beginning of the FBMC is approximated to 0, the first FBMC symbol is transmitted after truncating two data symbols, the second FBMC symbol is transmitted after truncating the first data symbol, and the fourth FBMC symbol is transmitted after truncating one data symbol in the post-transient transmission duration as shown in FIG. 12D. The first FBMC symbol is transmitted after truncating two symbols in the pre-transient transmission duration, and the second FBMC symbol is transmitted after truncating the first symbol in the pre-transient transmission duration. Although the FBMC symbols are transmitted as shown in FIG. 12D, the spectral distribution characteristic is not degraded unlike the above described first embodiment. This is because the preprocessing is applied to minimize the spectral distribution characteristic degradation caused by energy distribution of the symbols.

Figure 12E:
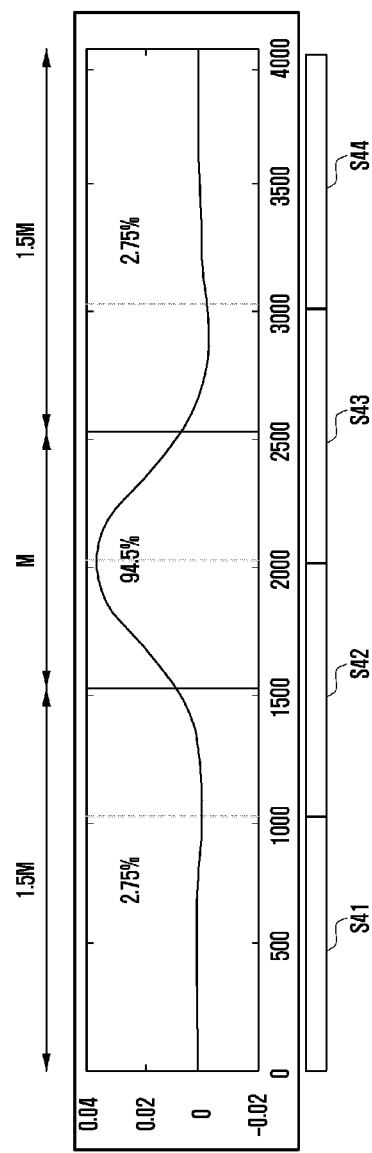
FIG. 12E is a diagram illustrating energy distribution where the energy is concentrated at the center of FBMC symbols with an overlapping factor L=4 according to an embodiment of the present disclosure.
Figure 12F:
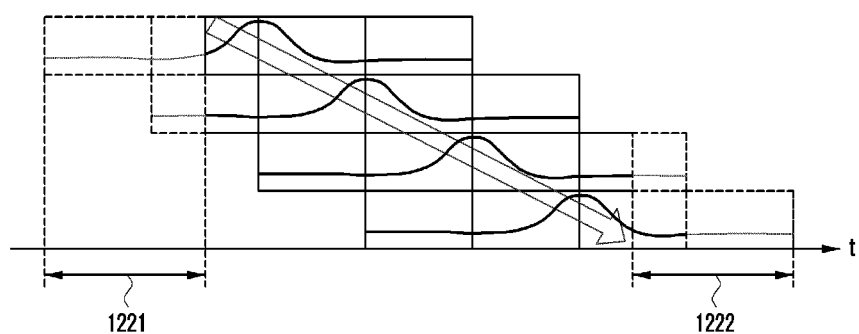
FIG. 12F is a diagram illustrating a transmission scheme in which the energy is concentrated at the center of FBMC symbols with an overlapping factor L=4 according to an embodiment of the present disclosure.

FIG. 12E shows the energy distribution where the energy is concentrated at the center of the FBMC symbols with the overlapping factor L=4, and FIG. 12F shows the transmission scheme in which the energy is concentrated at the center of the FBMC symbols with the overlapping factor L=4. FIG. 12E shows the case of using the filter with the center-concentrated symmetric energy distribution characteristic.

Referring to FIG. 12E, a filter is characterized by concentrating the energy at the center of the FBMC symbol with the overlapping factor L=4 as in the other filters. In the case that the overlapping factor is 4 and the energy is concentrated at the center of the FBMC symbol, the energy is distributed such that the first data symbol S41 and the first half of second data symbol S42 are assigned 2.75% of the energy, the last half of the second data symbol S42 and the first half of the third data symbol S43 are assigned 94.5% of the energy, and the last half of the third data symbol S43 and the fourth data symbol S44 are assigned 2.75% of the energy.

In the case that the energy is distributed as shown in FIG. 12E, it is not possible to truncate one data symbol at the beginning and end of the FBMC symbol respectively. This is clarified through the description with reference to FIGS. 12A to 12D. In the case that the energy is concentrated at the center of the FBMC symbol, it is possible to perform truncation as long as 1.5 symbol length (1.5 M) in the pre-transient transmission duration 1221 and post-transient transmission duration 1222 respectively. In this way, the truncation may be performed in certain length unit of data other than unit of non-CP OFDM symbol.

In the case of transmitting the FBMC symbol as shown in FIG. 12F, the energy distribution characteristic may change such that the energy level rise abruptly or drops from a high level to 0. In order to overcome this problem, it is necessary to change the energy characteristic. The energy characteristic change is described below with reference to accompany drawing.

As described above, in the case of changing the filter characteristics of the transmitter in specific or all symbol durations, the receiver has to know the information on the filters applied to the transmitter and receiver. A procedure for sharing the filter information between the transmitter and receiver is described below.

Figure 13:
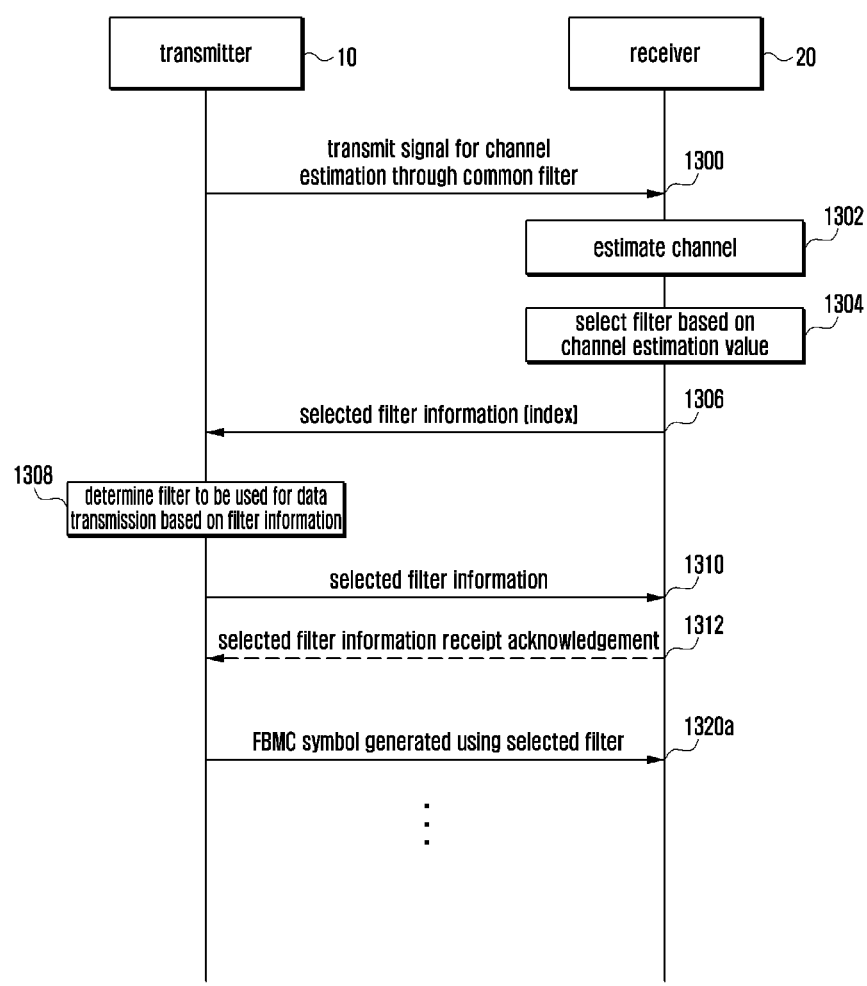
FIG. 13 is a signal flow diagram illustrating a procedure for a transmitter to select filter characteristics for FBMC symbol transmission and to share the filter information with a receiver according to an embodiment of the present disclosure.

FIG. 13 is a signal flow diagram illustrating a procedure for a transmitter to select filter characteristics for FBMC symbol transmission and to share filter information with a receiver according to an embodiment of the present disclosure.

Referring to FIG. 13, the transmitter 10 and receiver 20 are devices for transmitting and receiving data in the format of FBMC symbol and they are may be a base station, access point (AP), or terminal. For the purpose of explanation, it is assumed that the transmitter 10 is a base station and the receiver is a terminal.

The transmitter 10 may transmit a reference signal for use in channel estimation to receive FBMC data symbol from at least one receiver at operation 1300. The transmitter 10 may generate the reference signal using a common filter. The common filter may be the filter characterized by the energy distribution in which the energy is concentrated at the center as shown in FIG. 10A but not limited thereto, and agreed between the transmitter 10 and the receiver 20.

The receiver 20 receives the reference signal transmitted by the transmitter 10 at operation 1300 and estimates a channel based on the reference signal at operation 1302. The receiver 20 selects a filter suitable for the estimated channel at operation 1304. Suppose that there are 5 different filters available for use at the transmitter 10 and the receiver 20. The receiver 20 selects the best filter for the estimated channel based on the channel estimation result.

In the case that the filters are allocated indices, it is possible to reduce the data exchange amount between the transmitter 10 and the receiver 20. In the case that the overlapping factor (L) is 5, the filters having the characteristics as shown in FIGS. 10A to 10E may be used. In this case, the transmitter 10 and the receiver 20 may share the filter indices, such as "001" for the filter exemplified in FIG. 10A, "010" for the filter exemplified in FIG. 10B, and "011" for the filter exemplified in FIG. 10C. In this case the receiver 20 may determine the filter for use by selecting the corresponding filter index. The receiver 20 transmits the information on the selected filter or the selected filter index to the transmitter 10.

If at least one receiver transmits the selected index, the transmitter 10 determines the filter for use in data transmission based on the received filter information at operation 1308. If the transmitter 10 is a base station and has to transmit data to a plurality of user equipment (UEs), the transmitter 10 may determine the indices of the filters to be applied to the non-transient transmission duration FBMC symbol (full overlap FBMC symbol) and the transient transmission durations. The transient transmission durations may be sorted into the pre-transient transmission duration and post-transient transmission duration, and different filters may be applied to the respective transient transmission durations.

If the filters to be used for FBMC symbol transmission, the transmitter 10 sends the receiver 20 the selected filter information or filter indices at operation 1310.

In the case that the transmitter 10 and the receiver 10 are performing 1:1 communication, the receiver 20 may send the receiver 10 an acknowledgement signal acknowledging receipt of the selected filter information at operation 1312. Although the communication between the transmitter 10 and the receiver 20 is not the 1:1 communication, of operation 1312 may be performed.

If the transmitter is the base station broadcasting the selected filter information, the receiver 20 may be configured to not perform the operation 1312. This is because if the transmitter 10 is a base station all of the receivers may receive the information broadcast by the transmitter. If the individual receivers transmit acknowledgement signals in response to the broadcast signal, this increases system overload; accordingly, the acknowledgement operation may be omitted.

Through the above procedure, the transmitter 10 and the receiver 20 may share the filter information for FBMC symbol data communication. After sharing the filter information, the transmitter 10 processes the data to generate the FBMC symbol using the selected filter and transmits the FBMC symbol at operation 1320a.

Figure 14A:
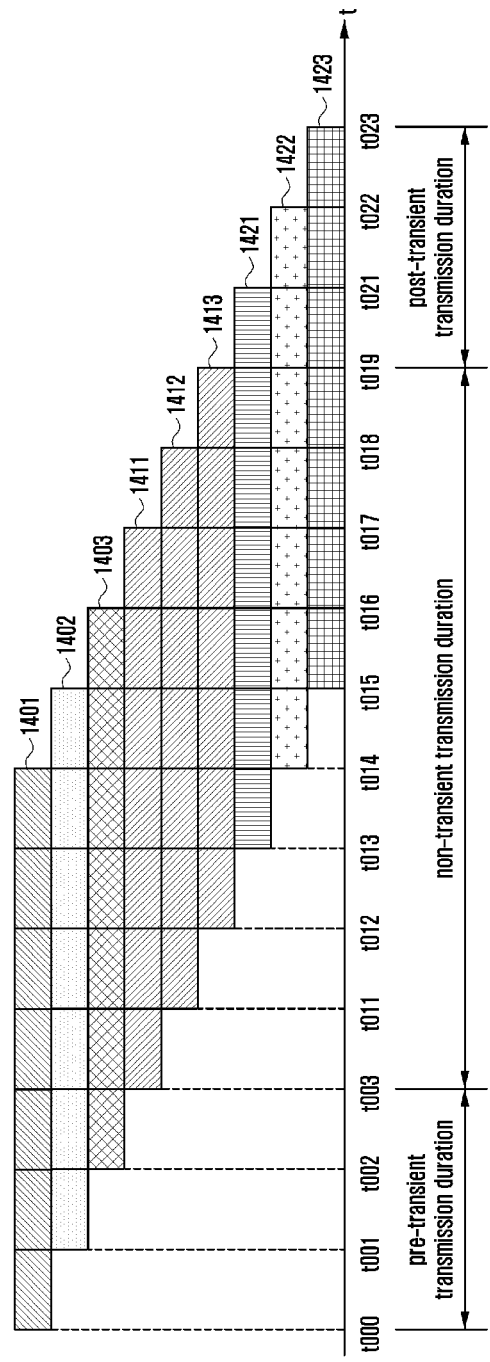
FIG. 14A is a diagram explaining transient transmission duration and non-transient transmission duration in the case of transmitting an FBMC symbol with an overlapping factor L=7 according to an embodiment of the present disclosure.

FIG. 14A is a diagram explaining transient transmission duration and non-transient transmission duration in a case of transmitting an FBMC symbol with an overlapping factor L=7 according to an embodiment of the present disclosure. FIG. 14A shows 9 FBMC symbols with the overlapping factor L=7 which are transmitted in series. The transmission timings of the 9 FBMC symbols with the overlapping factor L=7 are described with reference to FIG. 14A.

Referring to FIG. 14A, the pre-transient transmission duration is between t000 and t003, and the first to third data symbols of the first FBMC symbol 1401, the first to second data symbols of the second FBMC symbol 1402, and the first data symbol of the third FBMC symbol 1403, are positioned in the pre-transient transmission duration.

The non-transient transmission duration following the pre-transient transmission duration is between t003 and t019. The transmission of the first to third FBMC symbols 1401, 1402, and 1403 start in the pre-transmission transmission duration and end non-transient transmission duration. The transmission of the fourth to sixth FBMC symbols 1411, 1412, and 1413 start and end just in the non-transient transmission duration. The transmission of the seventh to ninth FBMC symbols 1421, 1422, and 1423 start in the non-transient transmission duration and end in the post-transient transmission duration between t019 and t023.

The last data symbol of the seventh FBMC symbol 1421 is positioned in the post-transient transmission duration, the last two data symbols of the eighth FBMC symbol 1422 are positioned in the post-transient transmission duration, and the last three data symbols of the ninth FBMC symbol 1423 are positioned in the post-transient transmission duration.

Figure 14B:
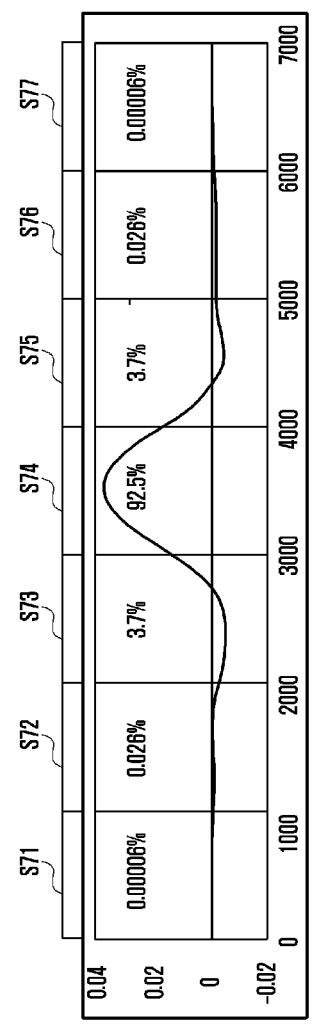
FIG. 14B is a diagram illustrating an energy distribution characteristic in an FBMC symbol with an overlapping factor L=7 according to an embodiment of the present disclosure.

FIG. 14B shows an energy distribution characteristic in an FBMC symbol with the overlapping factor L=7.

Referring to FIG. 14B, in the case that the overlapping factor L is 7, one FBMC symbol is transmitted in the duration corresponding to 7 non-CP OFDM symbols. Accordingly, the FBMC symbol with the overlapping factor L=7 consists of 7 data symbols S71, S72, S73, S74, S75, S76, and S77. In this case the energy is distributed such that the data symbols S71 to S77 are assigned 0.00006%, 0.026%, 3.7%, 92.5%, 3.7%, 0.026%, and 0.00006% of the energy in sequence. FIG. 14B may be a case where a filter has the characteristic of symmetric distribution with a central peak.

In the case that the FBMC symbol is configured such that the energy is concentrated in the fourth data symbol S74 at the center of the FBMC symbol, the energy is distributed symmetrically around the center of the fourth data symbol duration.

The FBMC symbols configured as shown in FIG. 14B are transmitted as shown in FIG. 14A such that the first three data symbols S71, S72, and S73 of the first FBMC symbol 1401 are truncated, the first two data symbols S71 and S72 of the second FBMC symbol 1402 are truncated, the first data symbol S71 of the third FBMC symbol 1403 is truncated, the last data symbol S77 of the seventh FBMC symbol 1421 is truncated, the last two data symbols S76 and S77 of the eighth FBMC symbols 1422 are truncated, and the last three data symbols S75, S76, and S77 of the ninth FBMC symbol are truncated.

In the case of truncating at least one data symbol of the FBMC symbol, the energy distribution characteristic of the FBMC symbol should be changed as shown in FIGS. 10A to 10E. In order to change the energy distribution characteristic, a corresponding filter is required.

The number of filters required in the case of truncating at least one data symbol of the FBMC symbol may be equal to the size of the overlapping factor. There is a need of distinct filters for the pre-transient transmission duration, non-transient transmission duration, and post-transient transmission duration.

In the case that the filter to be applied to a specific data symbol duration of the non-transient transmission duration has the characteristic of symmetric distribution with a central peak, it is possible to obtain the transient transmission duration filters in such a way of designing the pre-transient transmission duration filters first and inverting the pre-transient transmission duration filters for the post-transient transmission duration filters other than designing all new filters.

Figure 15A:
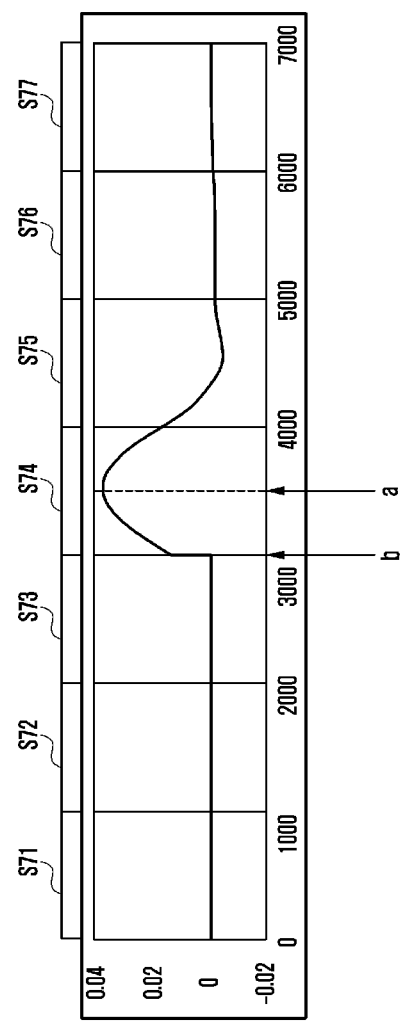
FIGS. 15A and 15B are diagrams explaining a method for configuring a transient transmission duration filter in the case of truncating 3 data symbols of an FBMC symbol with an overlapping factor L=7 according to an embodiment of the present disclosure.
Figure 15B:
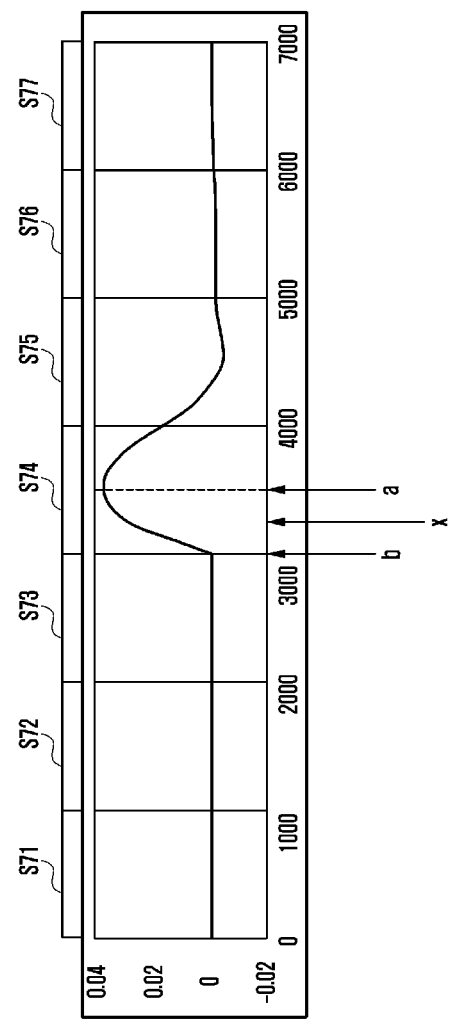

FIG. 15A and FIG. 15B are diagrams for explaining a method for configuring a transient transmission duration filter in a case of truncating 3 data symbols of an FBMC symbol with an overlapping factor L=7 according to an embodiment of the present disclosure.

Referring to FIG. 15A, since the data symbols S71, S72, and S73 are truncated in the pre-transient transmission duration, the energy level changes from 0 to a high level abruptly at the start time point of the fourth data symbol S74. As described above, abrupt change of energy distribution degrades the frequency selectivity. In order to overcome this problem, an embodiment of the present disclosure proposes a method of changing the energy distribution characteristic in the fourth data symbol S74.

FIG. 15A shows that an inflection point "a" of the energy level curve appears in the fourth data symbol S74. The energy level is highest at the inflection point "a" in the duration between the truncation endpoint "b" and the endpoint of the FBMC symbol, and the energy characteristic slope at the inflection point "a" is 0. Using the characteristics of the energy level inflection point, peak energy level point, and the time point when the slope of the energy characteristic becomes 0, it is possible to find the point "a" easily. It is also possible to find the time point "b" as the truncation endpoint easily.

A method for reconfiguring the energy distribution characteristic in the duration between the truncation endpoint "b" and the inflection point "a" in the FBMC symbol of which first three data symbols are truncated is described below with reference to FIG. 15B.

Assuming that the energy distribution characteristic between the time points "b" and "a" in the fourth data symbol S74 in FIG. 15A is f(x), g(x) representing a new energy distribution characteristic between the time points "b" and "a" in the fourth data symbol S74 as shown in FIG. 15B can be configured as equation (2).

$$g(x) = f(x) - \frac{f(b)\{f(a) - f(x)\}}{f(a) - f(b)}, \quad \text{Equation 2}$$
$$b \le x \le a$$

In FIG. 15A, the energy level rises from 0 to a high level abruptly at the time point "b". Accordingly, a predetermined amount of difference is calculated in the graph of the original energy distribution characteristic function f(x) to obtain the energy distribution characteristic as shown in FIG. 15B. For example, it is possible to generate g(x) function with the restriction from "b" to "a" while maintaining the energy levels at the time points "b" and "a" and use the original f(x) function after the time point "a".

Accordingly, it is possible for the energy characteristic to change smoothly by adjusting the energy level at the truncation endpoint to 0. Since the spectral characteristic is improved by changing the energy characteristic smoothly, it is possible to mitigate inter-symbol interference.

Figure 16A:
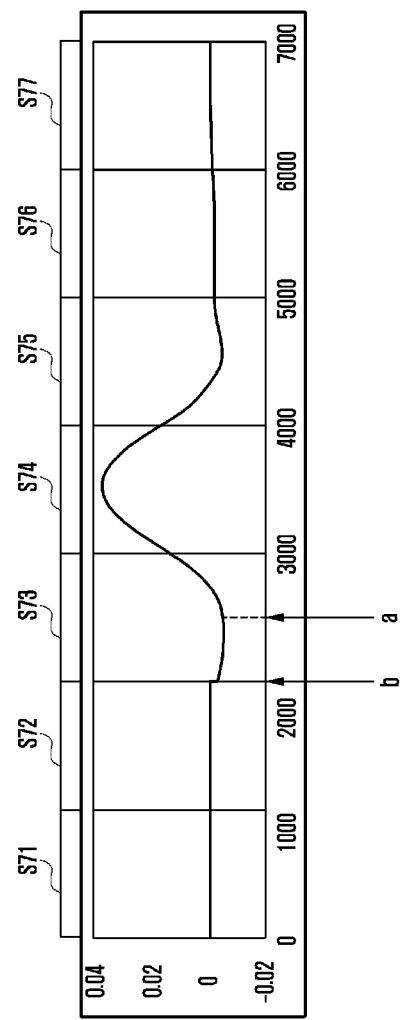
FIGS. 16A and 16B are diagrams explaining a method for configuring a non-transient transmission duration filter in the case of truncating 2 data symbols of an FBMC symbol with an overlapping factor L=7 according to an embodiment of the present disclosure.
Figure 16B:
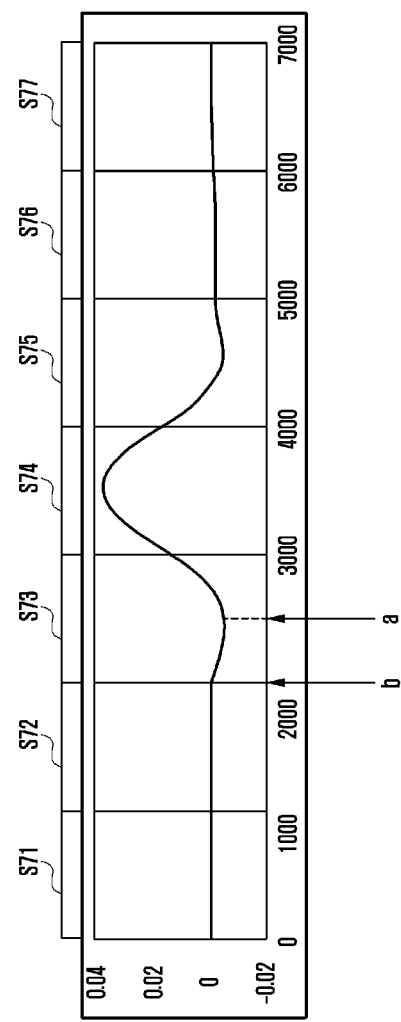

FIGS. 16A and 16B are diagrams explaining a method for configuring a non-transient transmission duration filter in the case of truncating 2 data symbols of an FBMC symbol with an overlapping factor L=7 according to an embodiment of the present disclosure.

Referring to FIGS. 16A and 16B, in the case of using a normal filter, the energy is concentrated in the fourth data symbol S74 at the center of the FBMC symbol as shown in FIG. 14B and distributed symmetrically around the center of the FBMC symbol. If the first two data symbols S71 and S72 are truncated in the pre-transient transmission duration as shown in FIG. 16A, the energy level changes from 0 to a low level at the boundary between the third and fourth data symbols S73 and S74. Thus a discontinuous point appears in the energy level curve. As described above, the frequency selectivity is degraded if the energy level changes abruptly in this way. In order to overcome this problem, an embodiment of the present disclosure proposes a method of changing the energy distribution characteristic in the third data symbol S73.

FIG. 16A shows that an inflection point "a" of the energy level curve appears in the third data symbol S73. At the inflection point "a", the energy level is lowest in the duration between the truncation endpoint "b" and the endpoint of the FBMC symbol, and the energy characteristic slop at the inflection point "a" is 0.

Using the characteristics of the energy level inflection point, peak energy level point, and the time when the slope of the energy characteristic becomes 0, it is possible to find the point "a" easily. It is also possible to find the time point "b" as the truncation endpoint easily.

A method for reconfiguring the energy distribution characteristic in the duration between the truncation endpoint "b" and the inflection point "a" in the FBMC symbol of which first two data symbols are truncated is described below with reference to FIG. 16B.

Assuming that the energy distribution characteristic between the time points "b" and "a" in the third data symbol S73 in FIG. 16A is f(x), g(x) representing a new energy distribution characteristic between the time points "b" and "a" in the third data symbol S73 as shown in FIG. 15B can be configured as Equation 2.

Referring to FIG. 16A, the energy level drops from 0 to a low level abruptly at the time point "b". Accordingly, a predetermined amount of difference is calculated in the graph of the original energy distribution characteristic function f(x) to obtain the energy distribution characteristic as shown in FIG. 16B. For example, it is possible to generate g(x) function with the restriction from "b" to "a" while maintaining the energy levels at the time points "b" and "a" and use the original f(x) function after the time point "a".

Accordingly, it is possible for the energy characteristic to change smoothly by adjusting the energy level at the truncation endpoint to 0. Since the spectral characteristic is improved by changing the energy characteristic smoothly, it is possible to mitigate inter-symbol interference.

The above described method can be used to change the energy characteristic even when the first data symbol S71 of the FBMC symbol is truncated. However, since almost 0 energy level is maintained in the first data symbol S71, the frequency selectivity is not degraded abruptly in the case of FIGS. 16A and 16B in which the first two data symbols are truncated even without change of the energy characteristic unlike the case of FIGS. 15A and 15B in which the first three data symbols are truncated.

The above-descriptions has been directed to the cases where the data symbol truncation is made in the pre-transient transmission duration. Since it is apparent that the above-described method can be applied to the post-transient transmission duration to change the energy characteristic in the same manner, detailed descriptions thereof are omitted herein.

Figure 17:
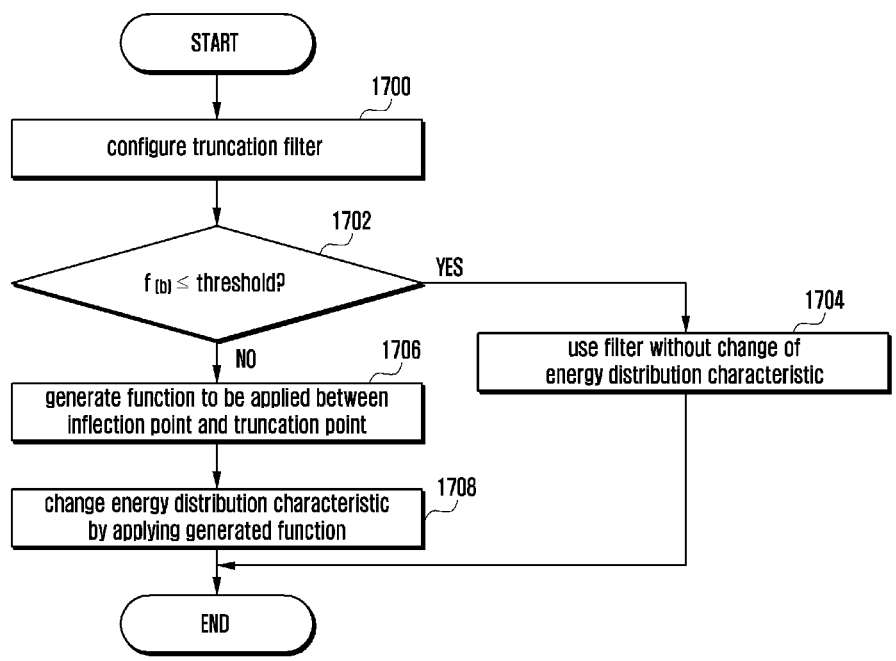
FIG. 17 is a flowchart illustrating a method of changing an energy characteristic of a truncation filter according to an embodiment of the present disclosure.

FIG. 17 is a flowchart illustrating a method of changing an energy characteristic of a truncation filter according to an embodiment of the present disclosure.

Referring to FIG. 17, the illustrated procedure may be performed by the transmission control unit 810 of the transmitter 10, and the filters may be designed to have the energy distribution characteristics in the stage of designing the transmitter according to an embodiment of the present disclosure. In the case that the filters are designed to have the energy distribution characteristics in the stage of designing the transmitter according to an embodiment of the present disclosure, the filters may be assigned the indices in advance. The following description is directed to the case where the filters are designed in advance for convenience of explanation.

The designer configures truncation filters for truncating part of the FBMC symbol based on the overlapping factor L with various energy distribution patterns, e.g. concentrated at the center, beginning, and end of the FBMC symbol, at operation 1700.

For example, the FBMC symbol with the overlapping factor L=3 may have the energy distribution pattern as shown in FIG. 5A, the FBMC symbol with the overlapping factor L=5 may have the energy distribution pattern as shown in FIG. 5B, and the FBMC symbol with the overlapping factor L=7 may have the energy distribution pattern as shown in FIG. 14B.

The FBMC symbol with the overlapping factor L=4 may have the energy distribution pattern in which the energy is concentrated at the beginning of the FBMC symbol as shown in FIG. 12A or at the end of the FBMC symbol as shown in FIG. 12C.

Even in the cases where the energy is distributed in other patterns, a truncation filter for truncating a specific part of the FBMC symbol in the pre-transient transmission duration and post-transient transmission duration can be configured. The truncation filter may be designed differently depending on the overlapping factor L and the energy distribution characteristic. The truncation filter may truncate part of the FBMC symbol which is positioned in a certain area, e.g. pre-transient transmission duration and post-transient transmission duration.

In a case where the overlapping factor is 3, the first data symbol (which is equal in length to a non-CP OFDM symbol) of the FBMC symbol is truncated in the pre-transient transmission duration, and the last data symbol (which is equal in length to a non-CP OFDM symbol) of the FBMC symbol is truncated in the post-transient transmission duration. This operation may be performed as described with reference to FIG. 4A.

In another case where the overlapping factor is 5, the first two data symbols (which are equal in length to two non-CP OFDM symbols) of the first FBMC symbol are truncated in the pre-transient transmission duration, and the first data symbol (which is equal in length to one non-CP OFDM symbol) of the second FBMC symbol is truncated in the pre-transient transmission duration. The last data symbol (which is equal in length to one non-CP OFDM symbol) of the second last FBMC symbol is truncated in the post-transient transmission duration, and the last two data symbols (which are equal in length to two non-CP OFDM symbols) of the last FBMC symbol are truncated in the post-transient transmission duration. This operation may be performed as described with reference to FIG. 4B.

In another case where the overlapping factor is 5, a part of the first FBMC symbol that is longer in length than one non-CP OFDM symbol and less than two non-CP OFDM symbols is truncated in the pre-transient transmission duration, and the first data symbol (which is equal in length to one non-CP OFDM symbol) of the second FBMC symbol is truncated in the pre-transient transmission duration. The last data symbol (which is equal in length to one non-CP OFDM symbol) of the second last FBMC symbol is truncated in the post-transient transmission duration, and a part of the last FBMC symbol that is longer in length than one non-CP OFDM symbol and less than two non-CP OFDM symbols is truncated in the post-transient transmission duration. The operation may be performed as described with reference to FIG. 10E.

In the cases where the overlapping factor is 4 and 7, the truncation can be made in the pre-transient transmission duration and post transient transmission duration in a similar manner. Particularly when the overlapping factor is set to an even number, the pre-transient transmission duration and post-transient transmission duration may vary if the symmetric energy distribution characteristic is modified as described above.

After configuring the truncation filters at operation 1700, the designer determines whether the energy value f(b) at the truncated part is greater than a predetermined threshold at operation 1702. The threshold may be set to a specific value, e.g. 0.0001, when the power of the filter is normalized to 1.

If the energy value at the truncated part is equal to or less than the threshold at operation 1702, then at operation 1704, the designer configures the truncation filter to be applied to the corresponding position such that the energy distribution characteristic is not changed. This is because the energy in the truncated part is almost 0 and thus truncation does not effect to the entire frequency spectrum although not adjust the energy waveform.

If the energy value at the truncated part is greater than the threshold, then at operation 1706, this means that the energy level in the truncated part differs from 0. Accordingly, the designer may change the energy distribution characteristic using the method of equation (2) such that the energy level changes smoothly. The energy distribution characteristic may be changed in a stepwise manner as follows:

First, adjust the energy in the truncated part to 0.

Second, find the inflection point in the first data symbol transmitted without truncation and generate a function g(x) which adjusts the energy distribution such that the energy level changes smoothly by adjusting the energy at the inflection point and the point where no truncation is made.

The function generated as above may be applied to the respective filters. In a case where the overlapping factor is 3 and one data symbol equal in length to one non-CP OFDM symbol is truncated in both the pre-transient transmission duration and post-transient transmission duration, the filters for the pre-transient transmission duration and post-transient transmission duration may be configured respectively. The filter may be configured in the form of the first filter 821 which truncates a part of the FBMC symbol in the pre-transient transmission duration and changes the energy characteristic or the third filter 823 which truncates a part of the FBMC symbol in the post-transient transmission duration and changes the energy characteristic as described with reference to FIG. 8. In the case that the overlapping factor is 5, it is necessary to configure two filters for the pre-transient transmission duration and two filters for the post-transient transmission duration respectively. In the case that there is no need for the filters of the pre-transient transmission duration and post-transient transmission duration to change the energy distribution characteristic according to the result of the determination at operation 1702, it may be enough to configure one filter for the pre-transient transmission duration and one filter for the post-transient transmission duration respectively.

In operation 1708, the designer generates the filter with the original energy distribution characteristic prior to performing truncation after the original inflection point or before the inflection poring by applying the function generated for the part between the first inflection point in the first data symbol duration of the FBMC symbol and the transmission start time.

The data transmission methods according to the above-described embodiment of the present disclosure may be applied to similar transmission formats in the same manners. For example, it may be possible to transmit offset quadrature amplitude modulation (OQAM)-FBMC symbols truncated as described in the above embodiments.

Figure 18A:
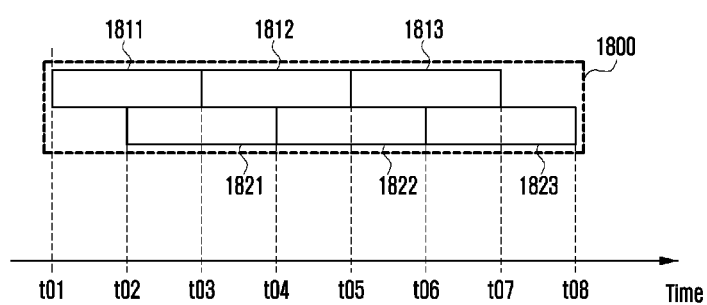
FIG. 18A is directed to a case where an overlapping factor L is 3 according to exemplary embodiment of the present disclosure.

FIG. 18A is a conceptual diagram explaining a configuration and transmission scheme of OQAM-FBMC symbols according to an embodiment of the present disclosure.

Referring to FIG. 18A, the overlapping factor L is 3. An OQAM-FBMC symbol 1800 with the overlapping factor L=3 is formed by repeating the same data symbol by as many as the value of the overlapping factor as described above. However, the OQAM-FBMC symbol is configured in a scheme different from that of the FBMC symbol due to its unique format. The OQAM-FBMC symbol is longer than the FBMC symbol as much as ½ symbol length due to its internal configuration characteristic.

Figure 18B:
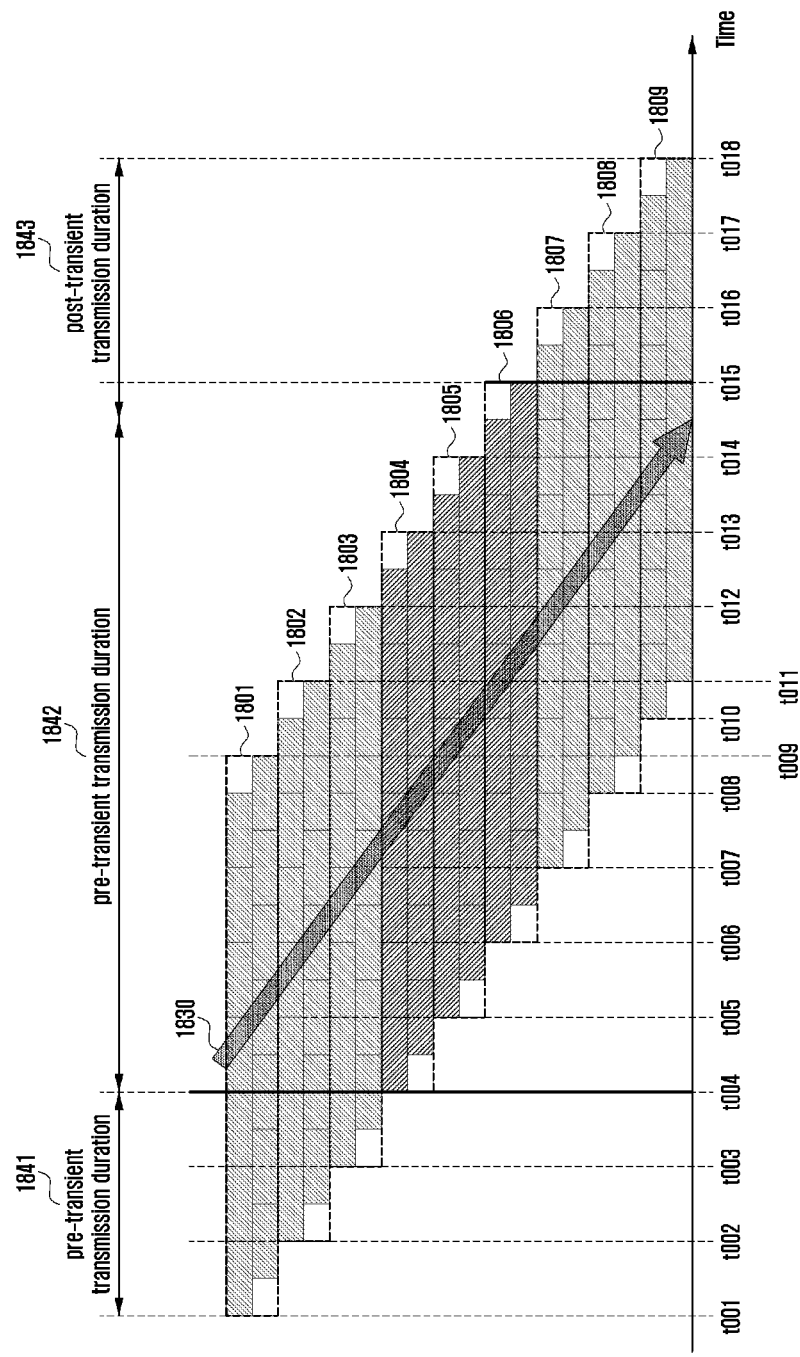
FIG. 18B is a diagram explaining pre-transient transmission duration, non-transient transmission duration, and post-transient transmission duration in the case of transmitting 9 OQAM-FBMC symbols with an overlapping factor L=7 transmitted in series according to an embodiment of the present disclosure.

FIG. 18B is a diagram explaining pre-transient transmission duration, non-transient transmission duration, and post-transient transmission duration in the case of transmitting 9 OQAM-FBMC symbols with an overlapping factor L=7 are transmitted in series according to an embodiment of the present disclosure.

Referring to FIG. 18A, the OQAM-FBMC symbol 1800 is comprised of Real (Re) part symbols and Imaginary (Im) part symbols. The real parts of the OQAM-FBMC symbol 1800 may correspond to the Re part symbols 1811, 1812, and 1813 and the imaginary parts may correspond to the Im part symbols 1821, 1822, and 1823. The OQAM-FBMC symbol 1800 differs from the FBMC symbol in that the OQAM-FBMC symbol 1800 consists of distinct Re and Im symbols. Since this configuration is well known in the art, detailed description thereof is omitted herein.

Also, the OQAM-FBMC symbol 1800 and FBMC symbol differ from each other in transmission timing. That is, the OQAM-FBMC symbol 1800 is characterized in that the Re part symbols 1811, 1812, and 1813 are transmitted in sequence between t01 and t07. That is, the first symbol 1811 of the Re part is transmitted in the duration between t01 and t03, the second symbol 1812 of the Re part is transmitted in the duration between t03 and t05, and the third symbol 1813 of the Re part is transmitted in the duration between t05 and t07.

The Im part symbols 1821, 1822, and 1823 of the OQAM-FBMC symbol 1800 are transmitted in sequence in the duration between t02 delayed by as much as ½ symbol length from t01 as the transmission start time point of the Re part symbols and t08. Accordingly, the first Im part symbol 1821 is transmitted in the duration between t02 and t04, the second Im part symbol 1822 of the Im part is transmitted in the duration between t04 and t06, and the third Im part symbol is transmitted in the duration between t06 and t08.

The transmission period of the OQAM-FBMC symbol is longer than that of the FBMC symbol as much as ½ symbol length in the case where the overlapping factor is 3.

The above-described energy distribution characteristic may be applied to the Re part symbols 1811, 1812, and 1813, and the Im part symbols 1821, 1822, and 1823, respectively, in the OQAM-FBMC symbol 1800. For example, if the energy distribution characteristic of symmetric distribution with a central peak which is described with reference to FIG. 5A is applied, the Re part symbols 1811, 1812, and 1813 have the energy distribution characteristics of the data symbols S31, S32, and S33; and the Im part symbols 1821, 1822, and 1823 have the energy distribution characteristics of the data symbols S31, S32, and S33. Accordingly, in the OQAM-FBMC symbol 1800, the 95% of the total energy is concentrated to the second Re part symbol 1812 and the second Im part symbol 1822. Meanwhile, the Re part symbols 1811 and 1813 and the Im part symbols 1821 and 1823 have 2.5% of the total energy, respectively.

FIG. 18B is a diagram explaining an OQAM-FBMC symbol transmission with the overlapping factor L=7 according to an embodiment of the present disclosure.

Referring to FIG. 18B, 9 OQAM-FBMC symbols 1801, 1802, 1803, 1804, 1805, 1806, 1807, 1808, and 1809 with the overlapping factor L=7 are transmitted in an overlapped manner. An OQAM-FBMC symbol means that the symbols are comprised of the Re part symbols equal in number to the value of the overlapping factor which are connected in series and the Im part symbols equal in number to the value of the overlapping factor which are connected in series, the start point of the Im part symbols being delayed as much as ½ symbol length in comparison to the transmission start time point of the Re part symbols as described with reference to FIG. 18A.

As shown in FIG. 18B, the transmission of the first OQAM-FBMC symbol 1801 starts at the time point t001 and ends at t009, and the transmission of the second OQAM-FBMC symbol 1802 starts at t002 and ends at t011. In this way, the transmission of the ninth OQAM-FBMC symbol 1809 starts at t010 and ends at t018. In the case of transmitting the OQAM-FBMC symbols 1801 to 1089 normally, the transmission efficiency is degraded in comparison to the case of transmitting the non-CP OFDM symbols as described above.

According to an embodiment of the present disclosure, it is possible to improve the transmission efficiency in such a way of configuring the pre-transient transmission duration and post-transient transmission duration, truncating the data symbols positioned in the pre-transient transmission duration and the post-transient transmission duration. In order to improve the transmission efficiency in this way, it is required to configure the pre-transient transmission duration, non-transient transmission duration, and post-transient transmission duration. Since the OQAM-FBMC symbol is longer than the FBMC symbol as much as ½ symbol length, a reference point should be determined to configure the pre-transient transmission duration and the post-transient transmission duration. In an embodiment of the present disclosure, the start point of the Re part symbols connected in series is used as the reference point to compute the pre-transient transmission duration 1841 using Equation 1. Also, the end point of the Im part symbols connected in series is used as the reference point to compute the post-transient transmission duration 1843.

FIG. 18B shows a case where the pre-transient transmission duration and post-transient transmission duration are configured by applying the above method. The pre-transient transmission duration 1841 may have a length equal to three symbol durations because the overlapping factor is 7. Even at this time, one data symbols is equal in length to one non-CP OFDM symbol. Accordingly, if the pre-transient transmission duration is configured to start at t001 as the start point of the first OQAM-FBMC symbol 1801, the pre-transient transmission duration 1841 has the length of three symbol durations between t001 and t004. As described above, the pre-transient transmission duration 1841 may be computed based on the Re part data symbols connected in series using formula (1).

In the case that the overlapping factor is 7, the post-transient transmission duration 1843 may have the length of three symbol durations. Accordingly, the post-transient transmission duration 1843 ends at the time point t018 as the end point of the last OQAM-FBMC symbol 1809 and thus three last data symbols should be truncated. As described above, the post-transient transmission duration 1843 may be computed based on the last three Im part data symbols of the last OQAM-FBMC symbol using formula (1) as described above.

As described above, the non-transient transmission duration 1842 may start at t004 and end at t015.

Even in the case of the OQAM-FBMC symbol, if the filter characteristic is not changed according to the energy distribution characteristic after performing truncation in the pre-transient transmission duration 1841 and post-transient transmission duration, this may cause transmission efficiency degradation. Accordingly, it is preferred to apply the energy characteristic change to transmit the OQAM-FBMC symbols according to an embodiment of the present disclosure.

The OQAM-FBMC symbol is comprised of the real and imaginary number part symbols as shown in FIGS. 18A and 18B, and the transmission is delayed by as much as ½ symbol length. Also, the receiver receives and processes the real and imaginary number part symbols distinctly and then combines the real and imaginary number part symbols into the original data. In the case of performing truncation in the pre-transient transmission duration and post-transient transmission duration, it may be necessary to apply different energy characteristic to the real and imaginary number part symbols, respectively, in the OQAM-FBMC symbol. The description thereof is made with reference to FIG. 19.

Figure 19:
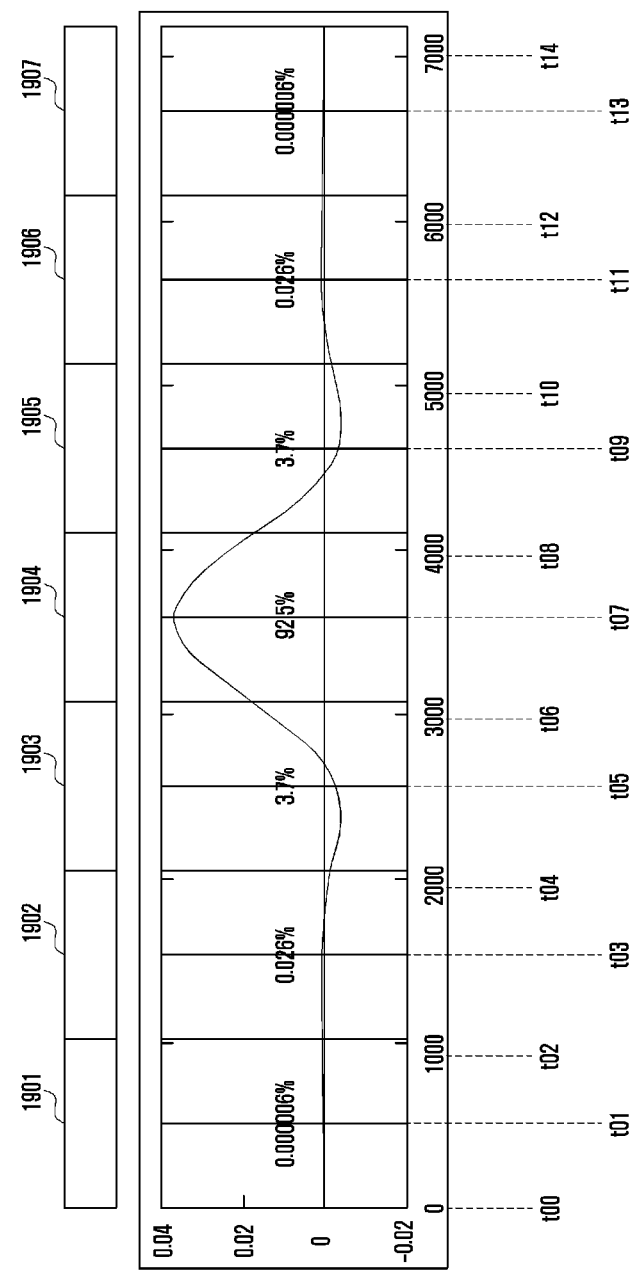
FIG. 19 is a timing diagram explaining an energy distribution characteristic and transmission timing of a OQAM-FBMC symbol with an overlapping factor L=7 according to an embodiment of the present disclosure.

FIG. 19 is a timing diagram for explaining the energy distribution characteristic and transmission timing of the OQAM-FBMC symbol with the overlapping factor L=7 according to an embodiment of the present disclosure. FIG. 19 shows the energy distribution characteristic of the filter used most widely in the FBMC-based wireless communication device which is symmetrical around the center.

Referring to FIG. 19, the OQAM-FBMC symbol with the overlapping factor L=7 is comprised of 7 real number part symbols and 7 imaginary number part symbols. Among the real and imaginary number part symbols of the OQAM-FBMC symbol, the first symbol 1901 has 0.000006% of the total energy, the second symbol 1902 has 0.26% of the total energy, the third symbol 1903 has 3.7% of the total energy, the fourth symbol 1904 has 92.5% of the total energy, the fifth symbol 1905 has 3.7% of the total energy, the sixth symbol 1906 has 0.026% of the total energy, and the seventh symbol 1907 has 0.000006% of the total energy.

The first OQAM-FBMC symbol 1801 consists of a real number part and an imaginary number part. As described above, the transmission timings of the real and imaginary number parts differ from each other. As a consequence, the truncation starts at different timings for the real and imaginary number parts.

In the first OQAM-FBMC symbol 1801, the first three real number part data symbols are truncated in the duration between t00 to t06, and the first three imaginary number part data symbols are truncated in the duration between t00 and t05. Accordingly, it is necessary to use different filters for the energy characteristics of the real and imaginary number part symbols in the first OQAM-FBMC symb01 1801. The energy filter characteristics may be adjusted in such a way of finding the inflection point and connecting the inflection point and the point when the energy level is 0 as far as smoothly as described above.

In the case of the second OQAM-FBMC symbol 1802, the real number part symbol truncation occurs in the duration between t00 and t04, and the imaginary number part symbol truncation occurs in the duration between t00 and t03. In the case of the third OQAM-FBMC symbol 1803, the real number part symbol truncation occurs in the duration between t00 and t02, and the imaginary number part symbol truncation occurs in the duration between t00 and t01. The imaginary number part is truncated in unit of 5/2 symbol, 3/2 symbol, and 1/2 other than one symbol in the pre-transient transmission duration.

The reference point is the last imaginary number part symbol in the post-transient transmission duration. Accordingly, in the case of the seventh OQAM-FBMC symbol 1807 of FIG. 18B, the real number part symbol truncation occurs in the duration between t13 and t14, the imaginary number part symbol truncation occurs in the duration between t12 and t14. In the case of the eighth OQAM FBMC symbol 1808, the real number part symbol truncation occurs in the duration between t11 and t14, and the imaginary number part symbol truncation occurs in the duration between t10 and t14. In the case of the ninth OQAM FBMC symbol 1809, the real number part symbol truncation occurs in the duration between t09 and t14, and the imaginary number part symbol truncation occurs in the duration between t08 and t14.

Since the symbols are truncated as described above, there is a need for two filters for applying two different energy characteristics in an OQAM-FBMC in which symbol truncation occurs. In the case that the energy distribution is symmetrical around the center, the energy characteristic filter designed for the pre-transient transmission duration can be used for the post-transient transmission duration with some modification. In more detail, the energy characteristic filter applied to the real number part in the pre-transient transmission duration may be reconfigured so as to be applied to the imaginary number part of the post-transient transmission duration with the opposite characteristic.

Accordingly, it is possible even in the OQAM-FBMC symbol to improve data transmission efficiency and minimize performance degradation caused by truncation as expected in the case of FBMC symbol. In the OQAM-FBMC symbol transmission, however, the number of filters increases twice in comparison with the FBMC symbol transmission. Although the description has been directed to the case of the symmetric energy distribution around the center, it is obvious to those skilled in the art that the above-described methods can be applied for transmission of OQAM-FBMC symbols having the pre-transient part or post-transient part-concentrated energy distribution characteristic.

As described above, the symbol transmission/reception method and apparatus of the present disclosure is advantageous in terms of acquiring transmission efficiency expected in transmitting OFDM symbols without CP, without compromising spectral confinement effect of the FBMC symbol transmission.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting filter-bank multi-carrier (FBMC) symbols in a FBMC system, the method comprising:
    determining a truncation point at a transient transmission duration based on an overlapping factor;
    truncating a length of a first FBMC symbol at the truncation point;
    after truncating the first FBMC symbol, filtering the first FBMC symbol using a first filter;
    filtering a second FBMC symbol corresponding to a non-transient transmission duration using a second filter; and
    concurrently transmitting the first filtered FBMC symbol and the second filtered FBMC symbol during the non-transient transmission duration,
    wherein an energy distribution characteristic of the second filter is changed based on an energy distribution characteristic of the first filter, and
    wherein a length of the first filtered FBMC symbol is smaller than a length of the second filtered FBMC symbol.

2. The method of claim 1, wherein the transient transmission duration is one of a pre-transient transmission duration in which FBMC symbol transmission starts and a post-transient transmission duration in which the FBMC symbol transmission ends.

3. The method of claim 1, wherein the energy distribution characteristic of the second filter is symmetrical around a center.

4. The method of claim 1,
    wherein the transient transmission duration is determined by the following equation, $$\frac{(L-1)}{2}M,$$

and
    wherein L denotes the overlapping factor and M denotes a length of one non-cyclic prefix (CP) orthogonal frequency division multiplexing (OFDM) symbol.

5. The method of claim 1, wherein the energy distribution characteristic of the first filter is not changed when the energy level at the truncation point is equal to or less than a predetermined threshold value.

6. The method of claim 1, wherein the energy distribution characteristic of the second filter is characterized in that energy is concentrated in a pre-transient transmission duration.

7. The method of claim 1, wherein the energy distribution characteristic of the second filter is characterized in that energy is concentrated in a post-transient transmission duration.

8. The method of claim 1, wherein the energy distribution characteristic of the first filter comprises setting, when an energy level at the truncation point of the first FBMC symbol is equal to or greater than a predetermined threshold value, the energy distribution characteristic of the first filter to 0 to connect the truncation point and a first inflection point following the truncation point linearly in an energy distribution curve.

9. The method of claim 1, wherein the energy distribution characteristic of the first filter comprises changing, when an energy characteristic function of the second filter is f(x), the energy distribution characteristic between the truncation point (b) and a first inflection point (a) following the truncation point according to a function g(x):

$$g(x) = f(x) - \frac{f(b)\{f(a) - f(x)\}}{f(a) - f(b)},$$

$$b \leq x \leq a.$$

10. An apparatus for transmitting filter-bank multi-carrier (FBMC) symbols in a FBMC system, the apparatus comprising:
- a switch configured to switch each FBMC symbol to one of a pre-transient transmission duration filter, a non-transient transmission duration filter, and a post-transient transmission duration filter;
- the pre-transient transmission duration filter configured to:
  - truncate a first FBMC symbol in a pre-transient transmission duration based on an overlapping factor, and
  - filter the truncated first FBMC symbol;
- the post-transient transmission duration filter configured to:
  - truncate a second FBMC symbol in a post-transient transmission duration based on the overlapping factor, and
  - filter the truncated second FBMC symbol;
- the non-transient transmission duration filter configured to filter a third FBMC symbol positioned within a non-transient transmission duration;
- a parallel/series conversion device configured to perform parallel/series conversion on the first FBMC symbol, the second FBMC symbol, and the third FBMC symbol; and
- at least one processor configured to control operations of the switch, the pre-transient transmission duration filter, the non-transient transmission duration filter, and the post-transient transmission duration filter,
- wherein the pre-transient transmission duration filter has a first energy distribution characteristic that changes an energy distribution characteristic of the non-transient filter based on a truncated position of the first FBMC symbol, and
- wherein the post-transient transmission duration filter has a second energy distribution characteristic that changes the energy distribution characteristic of the non-transient filter based on a truncated position of the second FBMC symbol.

11. The apparatus of claim 10, wherein the first energy distribution characteristic is symmetrical around a center.

12. The apparatus of claim 11,
wherein the pre-transient transmission duration and the post-transient transmission duration are determined by the following equation, $$\frac{(L-1)}{2}M,$$

and
wherein L denotes the overlapping factor and M denotes a length of one non-cyclic prefix (CP) orthogonal frequency division multiplexing (OFDM) symbol.

13. The apparatus of claim 12, wherein the first energy distribution characteristic of the pre-transient transmission duration filter does not change the first energy distribution characteristic if the energy level at a truncation point is equal to or less than a predetermined threshold value.

14. The apparatus of claim 12, wherein the second energy distribution characteristic of the post-transient transmission duration filter does not change the second energy distribution characteristic if the energy level at a truncation point is equal to or less than a predetermined threshold value.

15. The apparatus of claim 10, wherein a third energy distribution characteristic applied to the third FBMC symbol is characterized in that energy is concentrated in the pre-transient transmission duration.

16. The apparatus of claim 10, wherein a third energy distribution characteristic applied to the third FBMC symbol is characterized in that energy is concentrated in the post-transient transmission duration.

17. The apparatus of claim 10, wherein the first energy distribution characteristic is changed by setting, when an energy level at a truncation point of the first FBMC symbol is equal to or greater than a predetermined threshold value, the first energy distribution characteristic to 0 to connect the truncation point and a first inflection point following the truncation point linearly in an energy distribution curve.

18. The apparatus of claim 10, wherein the first energy distribution characteristic of the pre-transient transmission duration filter and the second energy distribution characteristic of the post-transient transmission duration filter are determined, when an energy characteristic function to be applied to the third FBMC symbol is f(x), between a truncation point (b) and a first inflection point (a) following the truncation point, according to g(x):

$$g(x) = f(x) - \frac{f(b)\{f(a) - f(x)\}}{f(a) - f(b)},$$

$$b \le x \le a.$$

19. A method of transmitting offset quadrature amplitude modulation (OQAM) filter-bank multi-carrier (FBMC) symbols in an OQAM-FBMC system, the method comprising:
- configuring a transient transmission duration and a non-transient transmission duration based on an overlapping factor;
- truncating a length of a first OQAM-FBMC symbol based on the transient transmission duration, the first OQAM-FBMC symbol including real number part symbols and imaginary number part symbols;
- after truncating the first OQAM-FBMC symbol, filtering the first OQAM-FBMC symbol in the transient transmission duration using transient transmission duration filters;
- filtering a second OQAM-FBMC symbol in the non-transient transmission duration using non-transient transmission duration filters; and
- concurrently transmitting the first filtered OQAM-FBMC symbol and the second filtered OQAM-FBMC symbol during the non-transient transmission duration,
- wherein the transient transmission duration filters comprise a first transient transmission duration filter for filtering the real number part symbols and a second transient transmission duration filter for filtering the imaginary number part symbols,
- wherein each transient transmission duration filter has an energy distribution characteristic that changes an energy distribution characteristic of each of the non-transient transmission duration filters based on the transient transmission duration, and
- wherein a length of the first filtered OQAM-FBMC symbol is smaller than a length of the second filtered OQAM-FBMC symbol.

20. The method of claim 19, wherein each energy distribution characteristic of the transient transmission duration filters comprises changing, when an energy distribution characteristic function of a filter to be applied to a OQAM-FBMC symbol transmitted within the non-transient transmission duration is f(x), the energy distribution characteristic of the each of the transient transmission duration filters between a truncation point (b) and a first energy level inflection point (a) following a truncation point of a truncated OQAM-FBMC symbol, according to g(x):

$$g(x) = f(x) - \frac{f(b)\{f(a) - f(x)\}}{f(a) - f(b)},$$
$$b \le x \le a.$$

21. An apparatus for transmitting offset quadrature amplitude modulation (OQAM) filter-bank multi-carrier (FBMC) symbols in an OQAM-FBMC system, the apparatus comprising:
a switch configured to switch each OQAM-FBMC symbol to one of a pre-transient transmission duration filter, a non-transient transmission duration filter, and a post-transient transmission duration filter;
the pre-transient transmission duration filter configured to:
truncate a first OQAM-FBMC symbol in a pre-transient transmission duration based on an overlapping factor, and
filter the truncated first OQAM-FBMC symbol by distinctly manipulating a real number part and an imaginary number part of the truncated first OQAM-FBMC symbol;
the post-transient transmission duration filter configured to:
truncate a second OQAM-FBMC symbol in a post-transient transmission duration based on the overlapping factor, and
filter the truncated second OQAM-FBMC symbol by manipulating a real number part and an imaginary number part of the truncated second OQAM-FBMC symbol distinctly;
the non-transient transmission duration filter configured to filter a third OQAM-FBMC symbol positioned within a non-transient transmission duration;
a parallel/series conversion device configured to perform parallel/series conversion on the first OQAM-FBMC symbol, the second OQAM-FBMC symbol, and the third OQAM-FBMC symbol; and
at least one processor configured to control operations of the switch, the pre-transient transmission duration filter, the non-transient transmission duration filter, and the post-transient transmission duration filter,
wherein the pre-transient transmission duration filter has a first energy distribution characteristic that changes an energy distribution characteristic of the non-transient transmission duration filter based on a truncated position of the first OQAM-FBMC symbol, and
wherein the post-transient transmission duration filter has a second energy distribution characteristic that changes an energy distribution characteristic of the non-transient transmission duration filter based on a truncated position of the second OQAM-FBMC symbol.

22. The apparatus of claim 21, wherein the first energy distribution characteristic is changed, when an energy characteristic function of the pre-transient transmission duration filter to be applied to the first OQAM-FBMC symbol is f(x), between a truncation point (b) and a first inflection point (a) following a truncation point (b) for the respective real number part and the imaginary number part of the first truncated OQAM-FBMC symbol or the second truncated OQAM-FBMC symbol, according to g(x):

$$g(x) = f(x) - \frac{f(b)\{f(a) - f(x)\}}{f(a) - f(b)},$$
$$b \le x \le a.$$

* * * * *